United States Patent
Issa et al.

[19]

[11] Patent Number: 5,872,519
[45] Date of Patent: Feb. 16, 1999

[54] ADVANCED EMBEDDED CODE HOPPING SYSTEM

[75] Inventors: Darrell E. Issa; Jerry W. Birchfield, both of Vista, Calif.; Charles Chen, Taipei, Taiwan

[73] Assignee: Directed Electronics, Inc., Vista, Calif.

[21] Appl. No.: 425,597

[22] Filed: Apr. 20, 1995

Related U.S. Application Data

[63] Continuation-in-part of Ser. No. 945,667, Sep. 16, 1992, Pat. No. 5,534,845, and a continuation-in-part of Ser. No. 112,940, Aug. 30, 1993, Pat. No. 5,532,670, which is a continuation-in-part of Ser. No. 886,871, May 22, 1992, abandoned, Ser. No. 396,115, Feb. 28, 1995, and Ser. No. 396,020, Feb. 28, 1995, abandoned.

[51] Int. Cl.⁶ ............................. H04L 9/12; E05B 65/36; G08L 17/02
[52] U.S. Cl. ......................... 340/825.31; 380/9; 380/23; 380/28; 375/202; 340/825.69
[58] Field of Search ................................... 380/37, 34, 9, 380/21, 23, 28, 25; 375/200, 205, 202; 370/18, 203; 340/825.3, 825.31, 825.34, 825.56, 825.69, 825.72

[56] References Cited

U.S. PATENT DOCUMENTS

| | | | |
|---|---|---|---|
| 4,596,985 | 6/1986 | Bongard et al. | 340/825.31 |
| 4,847,614 | 7/1989 | Keller | 340/825.56 |
| 4,856,062 | 8/1989 | Weiss | 380/23 |
| 5,103,221 | 4/1992 | Memmola | 340/825.31 |
| 5,146,215 | 9/1992 | Drori | 340/825.31 X |
| 5,191,610 | 3/1993 | Hill et al. | 380/21 |
| 5,442,341 | 8/1995 | Lambropoulos | 340/825.31 |

FOREIGN PATENT DOCUMENTS

| | | | |
|---|---|---|---|
| 0244332 | 11/1987 | European Pat. Off. | E05B 49/00 |
| 0385070 | 9/1990 | European Pat. Off. | E05B 49/00 |
| 0547725A1 | 6/1993 | European Pat. Off. | G08C 19/28 |
| 0570103A2 | 11/1993 | European Pat. Off. | E05B 49/00 |
| 00605996A1 | 7/1994 | European Pat. Off. | E05B 49/00 |
| 4204463A1 | 8/1992 | Germany | G08C 25/04 |
| WO 94/18036 | 8/1994 | Germany | B60R 25/00 |
| 2188514 | 9/1987 | United Kingdom | H04K 1/00 |

*Primary Examiner*—Michael Horabik
*Assistant Examiner*—William H. Wilson, Jr.
*Attorney, Agent, or Firm*—Sam Talpalatsky, Esq.

[57] ABSTRACT

A system for monitoring and controlling an area comprising a controller for controlling system operational functions; at least one remote-control transmitter for transmitting system commands to the controller in a code word having a fixed word and a hopping word therein; the fixed word comprising at least one fixed data bit and the hopping word comprising at least one changing data bit, wherein the hopping word changes its binary value from transmission to transmission of the system commands; and, means for scrambling bits of the fixed word and bits of the hopping word within the code word.

34 Claims, 12 Drawing Sheets

SCRAMBLED-CODE-HOPPING UNIQUE-TRANSMITTER TYPE ONE FLOW CHART

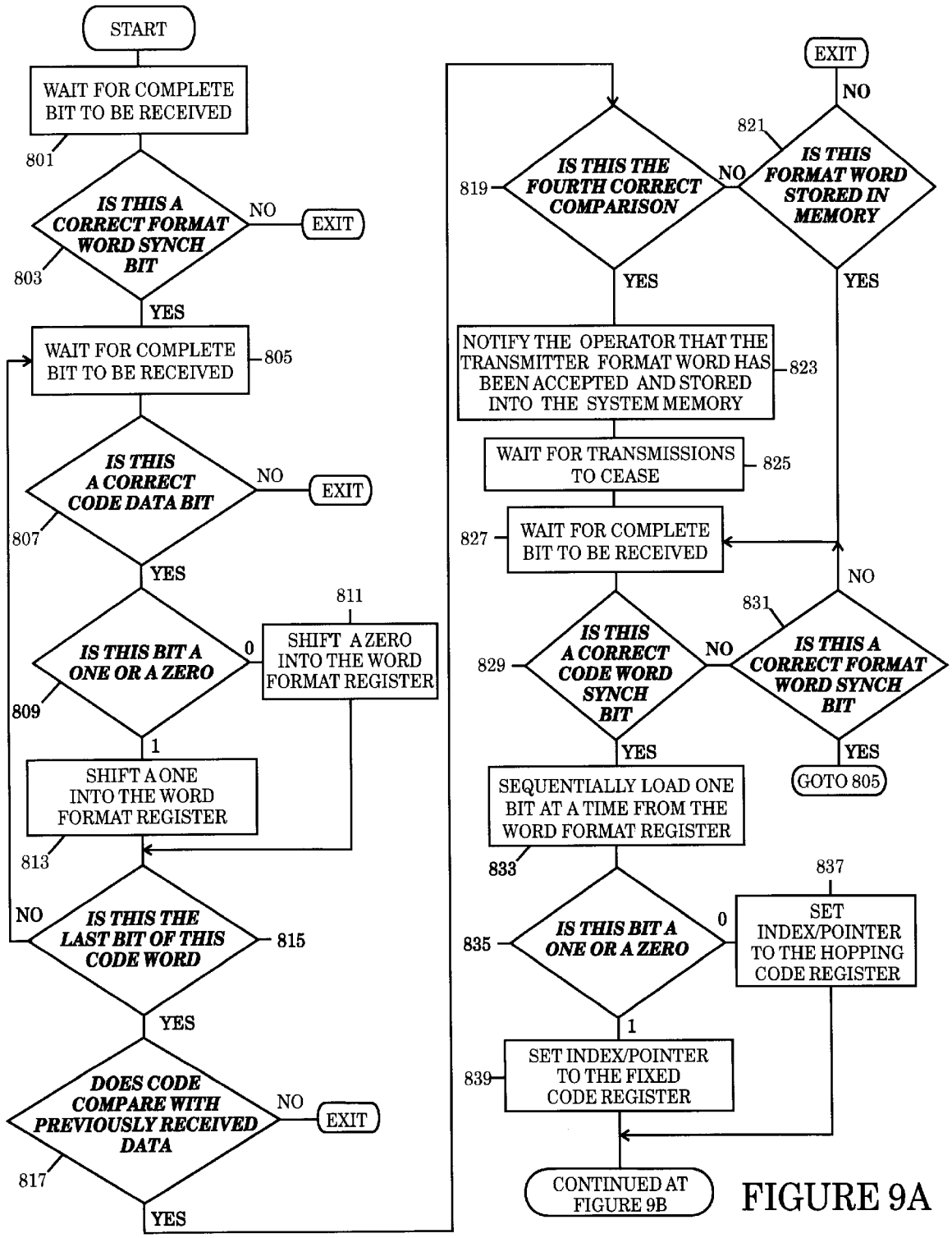

ADVANCED EMBEDDED CODE HOPPING SYSTEM

RELATION TO OTHER PATENT APPLICATIONS

This application for an "Advanced Embedded Code Hopping System" (Ser. No. 08/425,597) is a CIP of Ser. No. 07/945,667 dated Sep. 16, 1992 now U.S. Pat. No. 5,534,845; and a CIP of Ser. No. 08/112,940 dated Sep. 30, 1993 now U.S. Pat. No. 5,532,670, which is a CIP of Ser. No. 07/886,871 dated May 22, 1992 now abandoned; and a CIP of Ser. No. 08/396,115 dated Feb. 28, 1995 pending; and a CIP of Ser. No. 08/396,020 dated Feb. 28, 1995 now abandoned. The above are incorporated herein by reference.

BACKGROUND OF THE INVENTION

1. Field of the Invention

This invention relates to the field of security systems for monitoring restricted areas, such as in and around a vehicle, and provides more features, greater range of operator-system interface, and more user-friendly operation than those systems in the prior art. More particularly, this invention provides for remote communication from a remote-control transmitter to an alarm controller using a code word having interlaced/scrambled fixed bits and hopping/changing bits. This provides for additional security because a potential intruder is unable to decode/descramble the security code as the information therein is unpredictably and constantly changing from transmission to transmission and from transmitter to transmitter.

2. Description of Prior Art

At the present time there are a number of security systems available in the market. Many of these security systems employ remote-control transmitters to communicate commands to the associated system alarm controllers. A number of these systems use fixed code transmissions. In conventional fixed code transmissions, all non-channel identification bits remain the same from transmission to transmission when transmitted from the same transmitter. A typical transmission includes a synchronization bit or a preamble which is a group of bits used to wake the receiver up and preset its automatic gain control (AGC). This is followed by the remote control transmitter's serial number, address and/or channel identification bits. There can be as few as eight bits and as many as several hundred. Within this bit stream are the transmitter channel identification bits, anti-scan bits and other miscellaneous bits. These miscellaneous bits are employed for anti-scan purposes and/or to make the code word longer to hide the real address code more effectively.

There are two important security shortcomings to the fixed transmission techniques of the prior art. The transmitted codes are usually fixed or the number of code combinations is relatively small. These shortcomings lead to unauthorized access to a protected area. Such unauthorized access may be obtained by scanning through all of the combinations on systems having limited code combinations. Additionally, an intruder with a code grabber can record a conventional fixed code transmission of practically any length if its frequency is known is known to him or her. An intruder can use this recorded information to re-transmit the code at a later time and gain access to the area protected by the security system. Moreover, frequencies allotted to security systems are fixed in several countries of the world, which makes it easy to make and use a code grabber. The code grabbing principle is widely recognized as a very serious threat in these areas where the use of multiple radio frequencies is not permitted. Code grabbing remains a serious threat to all current conventional fixed code radio frequency remote-control security systems.

To improve security, code hopping may be utilized to prevent code capturing and scanning. The same is described in the U.S. Pat. No. 5,103,221, issued on Apr. 7, 1992, to Serafino Memmola. In code hopping systems a different or changing code word is used with every transmission. Most conventional code hopping systems are designed with fixed codes and hopping codes separated into their two respective sections. Other security systems only employ hopping words thereby changing the entire code of the word with each transmission. This makes it easy for an intruder to analyze and calculate simple hopping code algorithms used to change the hopping portion of the code word because the fixed and the changing bits are known to him. To overcome the shortcomings, these systems require more complex, longer word length and/or more sophisticated hopping algorithms to accomplish the same result as a less complex scrambled code hopping system of the present invention.

Scrambled code hopping is a method which provides high security, remote, radio frequency transmission of information or commands between a wireless, remote-control transmitter and a receiver of an alarm system. This technology is useful in remote-controlled vehicle alarms, automatic garage doors and other systems which rely on wireless communications. This invention provides for means to complicate the descrambling or deciphering of the transmitted code by scrambling or interlacing the fixed and hopping bits of the data word transmitted from a remote-control transmitter to an alarm controller. Scrambling the fixed and hopping codes provides for extreme complexity in descrambling the position, value and the significance of each transmitted bit, thereby establishing an effective barrier against intruders. In a scrambled transmission device of the present invention, it could take hours for a given hopping bit to change during extended transmission periods, thereby making it difficult to identify which bits are hopping and which bits are fixed. It also makes it difficult or impractical to decipher the security code. In addition, the present invention requires less complicated and simpler code hopping algorithms to achieve a high level of security at a reasonable cost.

SUMMARY OF THE INVENTION

The device of the present invention is an alarm system having at least one remote-control transmitter and an alarm controller receiving commands from a remote-control transmitter. To overcome the shortcomings of the prior art security system communications described above, the present device sends a scrambled code word from the remote-control transmitter to the alarm controller. The scrambled code word contains fixed bits and hopping or changing bits therein. These bits are scrambled such that without the knowledge of a format word which places fixed and the hopping bits in their respective position within the code word, it is not known which bits are fixed and which bits are hopping.

One way of implementing this invention is to provide the transmitter and the controller a format word which is used to scramble the bits in the transmitter and to descramble the bits into their respective fixed and hopping words in the controller. Thereafter, a specific preprogrammed hopping algorithm is performed by the controller on the last received hopping word to compare it with the incoming hopping word. If the two hopping words match and if the fixed code of the code word indicates that the transmitter used to send the code word is authorized to issue the commands, then the commands inscribed within the code word are executed. In addition, a learn mode provides for means to program or authorize a specific transmitter to issue commands to the alarm controller and it provides for the transmitter to program the controller with its identification code, its format word and/or its hopping algorithm.

A master-fixed-code technique of the present invention employs transmitters having a particular format word used to scramble the fixed and hopping bits. The remote-control transmitters do not transmit its format word to the controller and the controller does not initially have the format word for the remote-control transmitter. Furthermore, each remote-control transmitter may employ a unique format word. It is therefore necessary for the controller of this system to derive the format word from the incoming code word. In these systems a master-fixed-code format word is known to the controller and it provides for location of a portion of the fixed bits within a code word. In its learn mode, the controller applies a master-fixed-code algorithm to the received code word and thereby formulates a format word used to decipher the location of all fixed and all hopping bits. In addition, a part of or a subset of the fixed bits of the code word may be employed as a hopping code algorithm used to modify the last received hopping code. This format word is stored with the identification code of the transmitter and with its hopping code for receiving and executing scrambled code words from this transmitter.

Another embodiment of this invention provides transmitters which are capable of transmitting its format word and/or an initial hopping word to a controller. This provides the controller with the ability to learn the hopping code, hopping algorithm, identification code and the format word of the particular transmitter which in turn allows it to operate with the transmitter as described. The first type of transmitter of this system transmits an initial code word and a format word in tandem, one after another. The second type of transmitter of this system first transmits a series of code words and a subsequent series of format words, wherein the code and format words do not change their respective value during the transmission.

It is therefore the main object of this invention to provide a security system employing a controller receiving commands from a remote control transmitter which utilizes high security communications by transmitting a scrambled code word consisting of a fixed group of bits and a hopping group of bits which are scrambled in a fashion defined by its format word. It is the object of this invention to provide for a learn mode allowing the controller of this system to learn at least one transmitter having a particular hopping code, format word and identification code to effectuate the use of scrambled code transmissions and to accept commands therefrom. It is another object of this invention to provide for a controller having a master-fixed-code format word to learn the format word, identification code and hopping algorithm from a remote-control transmitter which does not transmit a format word to the controller. It is another object of this invention to provide for a remote-control transmitter to transmit to a controller its format word and its initial code word in tandem for the controller to learn the format word, initial hopping code and identification code for subsequent operation therebetween. It is an object of this invention to provide for a remote-control transmitter to transmit to a controller its format word and its initial code word for the controller to learn the format word, the initial hopping code and identification code for subsequent operation therebetween. It is further the object of this invention to provide for a security system which overcomes all the shortcomings heretofore mentioned in the prior art security systems and to provide for a higher level of security in remote control communications with alarm controllers. These and other objects of the invention may be obtained by reading the following specification along with the drawings that are appended hereto. The protection sought by the inventor may be gleaned from a fair reading of the claims that conclude this specification.

DESCRIPTION OF DRAWINGS

FIGS. 9A and 9B are a flow chart for system controller learn routine using a type one remote-control transmitter; and, FIG. 10A and 10B are a flow chart for system controller learn routine using a type two remote-control transmitter.

DESCRIPTION OF THE PREFERRED EMBODIMENT

SCRAMBLED CODE HOPPING

Figure 1:
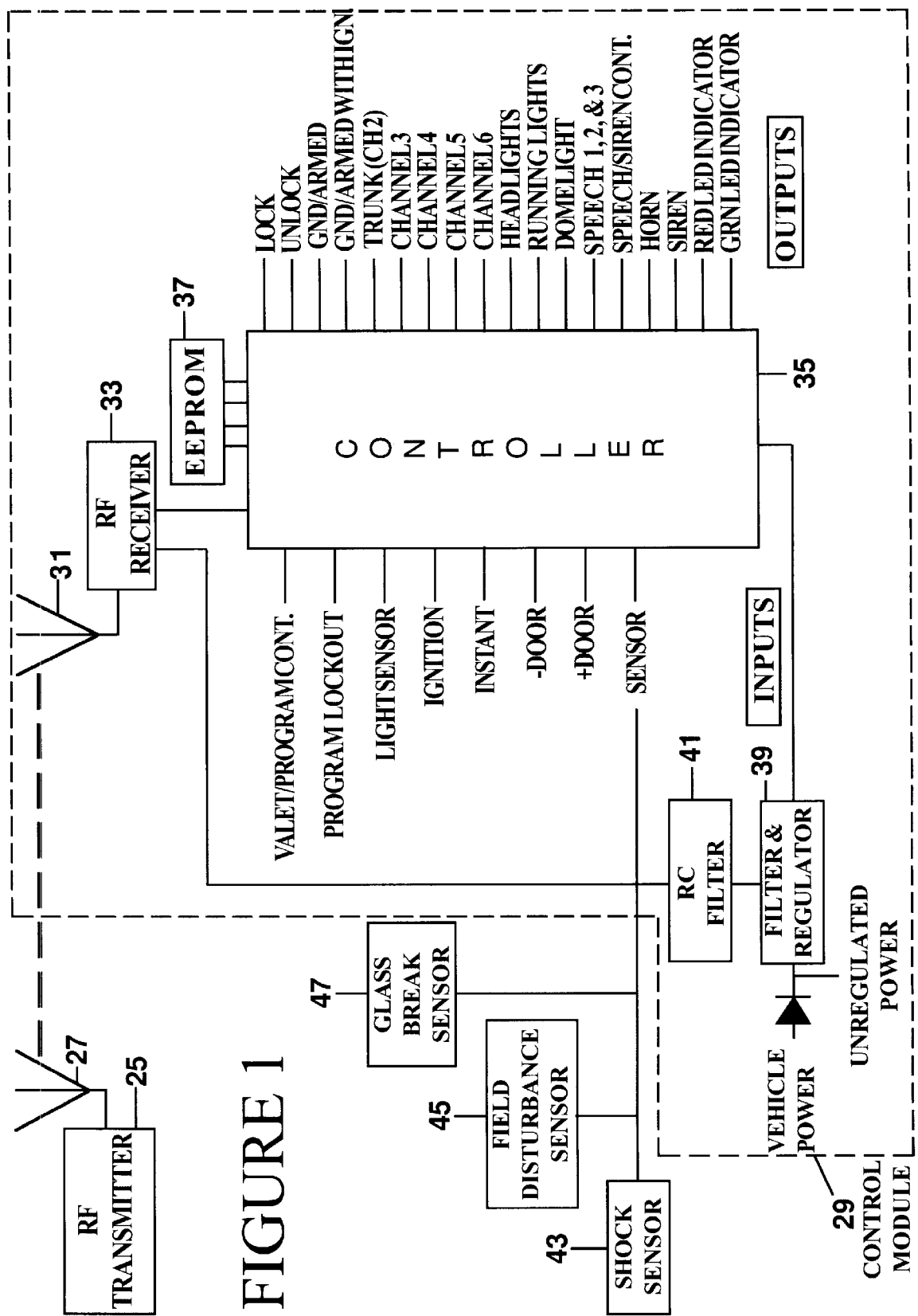
FIG. 1 is block diagram of the primary functional components of the security system in accordance with the invention.

FIGS. 2(A) and 2(B) illustrate the bit group configurations for fixed and conventional code hopping systems. FIG. 2(C) shows a scrambled code hopping transmission of a code word. A code word contains a number of fixed bits and a number of hopping bits. Throughout this specification the term "fixed code" and the term "fixed word" will be used synonymously. Each fixed word has at least one fixed data bit therein. Throughout this specification the term "hopping code" and the term "hopping word" will be used synonymously. The term "hopping" is interchangeably used with and has a meaning of "changing" or "varying". Each hopping word has at least one hopping or changing data bit therein. Additionally, the term "code word" is used throughout this specification. This term includes the hopping word and the fixed word therein. The fixed and hopping words are a part of the code word and each one is not used or employed without the other in the code word.

Scrambled code hopping follows all the principles of conventional code hopping plus it scrambles or interlaces the fixed codes and the hopping codes to construct the code word. Thus, fixed bits of the fixed word and hopping bits of the hopping word are desegregated from their respective words and are intertwined or mixed or scrambled to construct a scrambled code word. As an example, the result is a code word which has a fixed bit, followed by a hopping bit, followed by two fixed bits, followed by five hopping bits, followed by one fixed bit, . . .

The scrambled code hopping system uses two or more groups of fixed code and at least one or more groups of hopping code, or two or more groups of hopping code and at least one or more groups of fixed code. Each one of these groups has a length of one or more bits. More groups with fewer bits per group make it more difficult to decipher or unscramble shorter code words. Shorter transmissions with fewer bits also allow for better reception, since it requires a shorter period of time for the transmission. With shorter periods of time required for each transmission, there is less chance of RF or electrical interference creating an interruption in the transmission.

In the conventional scrambled code embodiment of the invention, a format word and a hopping algorithm are preprogrammed into the remote-control transmitter of the system and into the controller of the system. This hopping algorithm may consist of a mathematical algorithm and is used to generate the hopping words for each remote transmission. The format word allows the encoder of the remote-control transmitter to arrange the code word in a scrambled predefined arrangement where fixed and hopping bits are desegregated and mixed about. It also allows the controller to descramble and segregate the fixed and hopping words during receipt of the code word.

Another embodiment of this invention uses a fixed code method where a part of the fixed code could also be a part of an algorithm that establishes the number, sequence, and length of all the groups of the fixed and the hopping codes. In addition, it could also contain a serial number or identification code that allows the encoder and decoder to use a look-up table to set the number, sequence, and length of the groups of the fixed and hopping codes. This look-up table could also be a mathematical algorithm.

An alternate embodiment or method of scrambling the fixed and hopping codes is to transmit from the encoded transmitter both the code scrambling algorithm/the format word and the code word, which contains a fixed code word and a hopping code word, during the transmitter learn routine. These transmitters are unique from transmitter to transmitter. The total number of bits within a code word can vary from transmitter to transmitter. The decoding system of the alarm learns the system algorithm and/or the format word to determine where the fixed and hopping bits are within the code word. This requires the transmitter to have the capability to enter a routine or a learn mode that would first transmit the system algorithm and/or code format word. The format word specifies which bits of the transmitter code word are fixed (serial number and channel identification), which bits are hopping or changing, the hopping algorithm and the location of all the bits. Finally, the format word may also contain the hopping algorithm used by the system. Subsequent transmission periods from this transmitter contain normal transmitter code words with scrambled fixed codes and hopping codes, so that the decoding system of the alarm is able to decode or descramble the code word received from the remote-control transmitter.

Another type of this unique scrambled code hopping transmitter alternately transmits the format word and the normal transmitter code word. With this type of transmitter, the format word and the transmitter code word are learned in one transmission period by the alarm system. The format word just received is used to sort the fixed and hopping codes as they are received. Both of these unique scrambled code hopping transmitters require a different synchronization bit for the format word to distinguish between the format word and the normal transmitter code word.

FIG. 1 represents a simplified block diagram of the primary functional components of a security system of this invention. In the preferred embodiment, this security system is used for securing a vehicle. However, the system of the present invention may be used to secure other areas such as houses, buildings or the like. The security system generally involves the interaction between an operator and a system controller 35 to control, exercise and activate various system operational functions and features of the system. The system of the preferred embodiment includes a radio-frequency (RF) remote-control transmitter 25 and a control module 29. Control module 29 includes an RF receiver 33, which receives a digital, encoded signal through an antenna 31. This signal is sent from remote-control transmitter 25 through its antenna 27. Other components of the system which are embodied within control module 29 include controller 35, a power supply 39, an RF power supply RC filter 41, a decoder (not shown) and an external electrically programmable and erasable read-only memory EEPROM 37. Additionally, external to control module 29 are various sensors, including, but not limited to a shock sensor 43, a field disturbance sensor 45, and a glass break sensor 47. The incoming digital signal code is referred to herein as the code word. It is either presented directly to controller 35, for decoding, or in the alternative, to the system integrated circuit decoder (not shown) for decoding or descrambling the code word and to extract and provide the proper channel outputs which are then presented to controller 35 for execution. The interpretation of the language is to execute a specific command as desired by the user/operator by depressing or activating a switch of remote-control transmitter 25.

The system of the preferred embodiment provides a user with an opportunity to employ a plurality of system hardware to generate status and alarm inputs. These inputs are shown along the left side of controller 35. These inputs communicate a breach of security to the area and/or provide system commands to controller 35 as described below. The system hardware may include, but is not limited to program switches, jumpers, or jumper pins, valet switches, ignition switches, and/or a myriad of sensors.

Most commands are communicated to controller 35 during normal use of the vehicle, such as turning the ignition on or off, and opening or closing of the hood, trunk, or doors. Remote-control transmitter 25, in the hands of the operator or user, can issue/communicate operational, operational function programming, system, and operational testing commands to controller 35. These commands are represented by a stream of binary bits of data that are assembled into a predetermined sequence to make up the code word which is communicated to controller 35. This code word may contain remote-control transmitter's 25 fixed serial number, identification code, channel identification bits, anti-scan bits, synchronization bits, algorithm bits and/or any other information required or desired by a particular system or application. These remote-control transmitter 25 code words are assembled at remote-control transmitter 25 to communicate specific commands to controller 35.

The preferred embodiment of this invention provides for the code word sent from remote-control transmitter 25 to change its binary value from transmission to transmission by changing the binary value of its hopping word. This invention further provides for the code word to employ a fixed word having a number of bits which are fixed and do not change their binary value within the code word from word to word and from transmission to transmission. It also provides for a hopping word having a number of bits that are hopping or change their binary value with each transmission, thereby inhibiting a potential intruder from deactivating or disarming the alarm system. Finally, this invention provides for interlacing or scrambling the fixed code bits with the changing or hopping bits. This provides for a very difficult descrambling operation to a potential thief or intruder, as he or she would not know which of the bits in the code word are fixed and which are hopping/changing. Thus, a potential thief is unable to predict or decipher the code word and therefore is unable to send the system the correct code word to disarm it.

Throughout this text the language "hopping" will be interchangeably used with the language "changing". The two have the identical meaning of changing binary value. Throughout this text the language "scrambled" will be interchangeably used with the language "interlaced". The two terms have the identical meaning of positioning fixed and hopping code bits in an intermixed or unsegregated arrangement wherein some fixed bit or bits are surrounded or are positioned adjacent to some hopping bit or bits and vice versa.

In one preferred embodiment of this invention, remote-control transmitter 25 code, including its hopping algorithm, location of its fixed and hopping bits, its security identification, channel identification and the like is preset in remote-control transmitter 25 by programming initiated by remote-control transmitter 25 encoder manufacturer, remote-control transmitter 25 manufacturer, the installation facility, or the user.

The preferred embodiment of this invention is embodied within an auto security system. In the preferred embodiment, the vehicle battery and associated filter and regulator 39 supply power to control module 29. The battery provides a nominal 12.6 volts direct current (DC) power to all powered inputs to control module 29. Power supply 39 filters and regulates the power to supply either 5 or 12 volts as required by the components of control module 29. RF receiver 33 power is further isolated and filtered by an additional resistor and capacitor (RC) filter 41. Remote-control transmitter 25 is normally powered by either 3 volt lithium batteries (one or more) or by a 9 or 12 volt miniature alkaline battery.

In the preferred embodiment, remote-control transmitter 25, as shown in FIG. 1, provides a pulse-width-modulated (hereafter referred to as PWM) radio frequency (hereafter "RF") signal, wherein an RF carrier is modulated (turned on and off by variable pulse widths) at some predetermined frequency by pulses from an internal encoder integrated circuit (not shown). The encoder generates a binary digital code and the pulse width of each pulse determines if the code bit is a zero or a one. Although the preferred embodiment employs PWM techniques to transmit code data from remote-control transmitter 25 to control module 29, other transmission techniques are equally suitable. Some of these techniques include pulse position coding (PPC), frequency shift keying (FSK), Manchester encryption and the like.

Figure 2:
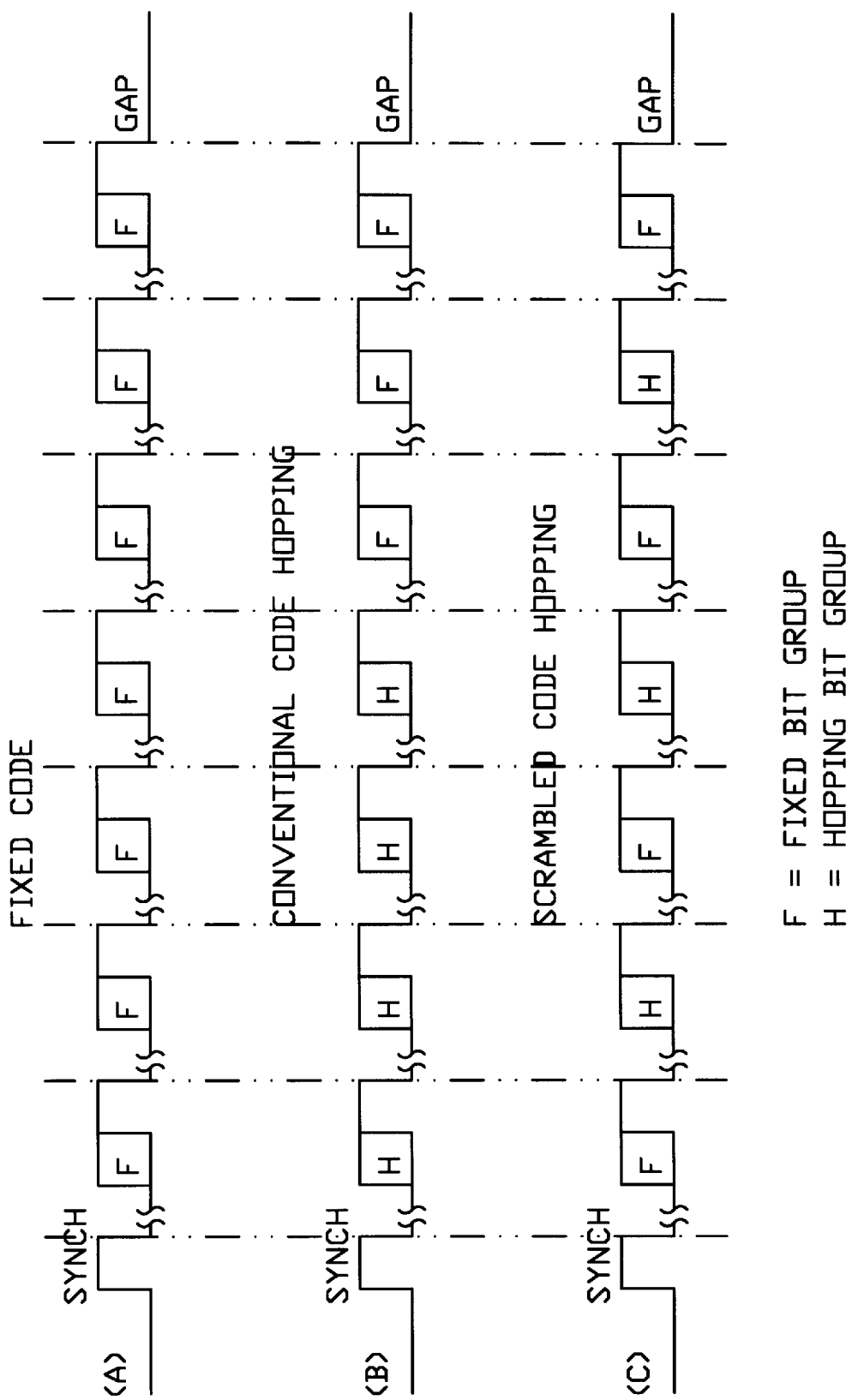
FIG. 2 is a timing diagram illustrating fixed code, conventional code hopping and scrambled code hopping transmissions.

FIG. 2 is a timing diagram of the data signals generated by an encoder in remote-control transmitter 25, which are then transmitted using pulse width modulated RF signals to control module 29. These signals are received, amplified, and detected by RF receiver 33 and sent to controller 35 for decoding.

In FIG. 2, all code words are divided into multiple groups. FIG. 2 illustrates a total of seven groups for illustrative purpose only. In actual application of this invention, there may be more or fewer groups of bits. These groups can vary in length from 1 to n bits.

In the preferred embodiment, each activation of remote-control transmitter 25 mechanically operated switch or switch means generates or activates a transmission of multiple, identical code words from remote-control transmitter 25 to control module 29. These code words are separated by a gap which is a dead period of time where no data or information is transmitted. Gap of the preferred embodiment is approximately equal to the period of time necessary to transmit the code. In the preferred embodiment, the code is 36 bits long. Therefore the time between synchronization bit to synchronization bit of sequential code words is 73 bit periods. Gap may be as short as 2 bits and as long as 2 or more complete data code words. Some systems, in countries where the duty cycle of the transmissions is of no concern, do not have any gap at all. Gap time is employed to comply with certain communication regulations which may be different from location to location and may vary depending on the components chosen to assemble the device of this invention. Readers of this disclosure are referred to their local libraries to investigate the rules and regulations provided by government agencies which oversee communications. Gap may vary from zero to n milliseconds.

DESCRIPTION OF CONVENTIONAL, SCRAMBLED/INTERLACED CODE HOPPING

The scrambled/interlaced code hopping system uses two or more groups of fixed code and one or more groups of hopping code, or two or more groups of hopping code and one or more groups of fixed code. Throughout the disclosure of this invention, the term "hopping code" is equivalent to the term "hopping word" and the term "fixed code" is equivalent to the term "fixed word". Each group may have a length of one or more binary bits. More groups of bits allows fewer bits per group. With very short bit groups, it is more difficult to decipher the shorter code word. Shorter transmissions with fewer bits also allow for better reception, since it takes a shorter period of time for the transmission, and with fewer bits to analyze for accuracy and security by the system controller 35, therefore there is less chance of transmission error. With shorter periods of transmission, there is also less chance of RF, electrical or the like interference corrupting the transmission of the code word.

TRANSMITTER OPERATION

In the preferred embodiment, remote-control transmitter 25 and controller 35 have access to a format word which defines the location of fixed and hopping bits of the particular remote-control transmitter 25. In this embodiment, the hopping algorithm and the format word must be known at all times by both the encoder (not shown) of remote-control transmitter 25 and controller 35. This is necessary because the encoder sends a hopping word which is modified by the hopping algorithm n-times, wherein the hopping algorithm modifies the previous hopping word of the last transmission cycle from remote-control transmitter 25 every time remote-control transmitter 25 transmits a code word to controller 35. Controller 35, upon receipt and recognition of remote-control transmitter 25 identity, through its fixed word, retrieves the last hopping word sent by that particular remote-control transmitter 25 and operates the same hopping algorithm on this last received hopping word. The result is an identical or matching binary number or value which provides controller 35 with a signal, trigger or authority to perform the system commands such as arm or disarm commands or channel execution sent by remote-control transmitter 25. Therefore, an n-times modified hopping word of remote-control transmitter 25 will match (have the same binary value) as an m-times modified hopping word received by controller 35, where n and m have the same numeric value and signify the number of times a new hopping word was generated by the remote-control transmitter 25 and the number of times controller 35 received a new transmission from this particular remote-control transmitter 25, respectively.

Figure 3:
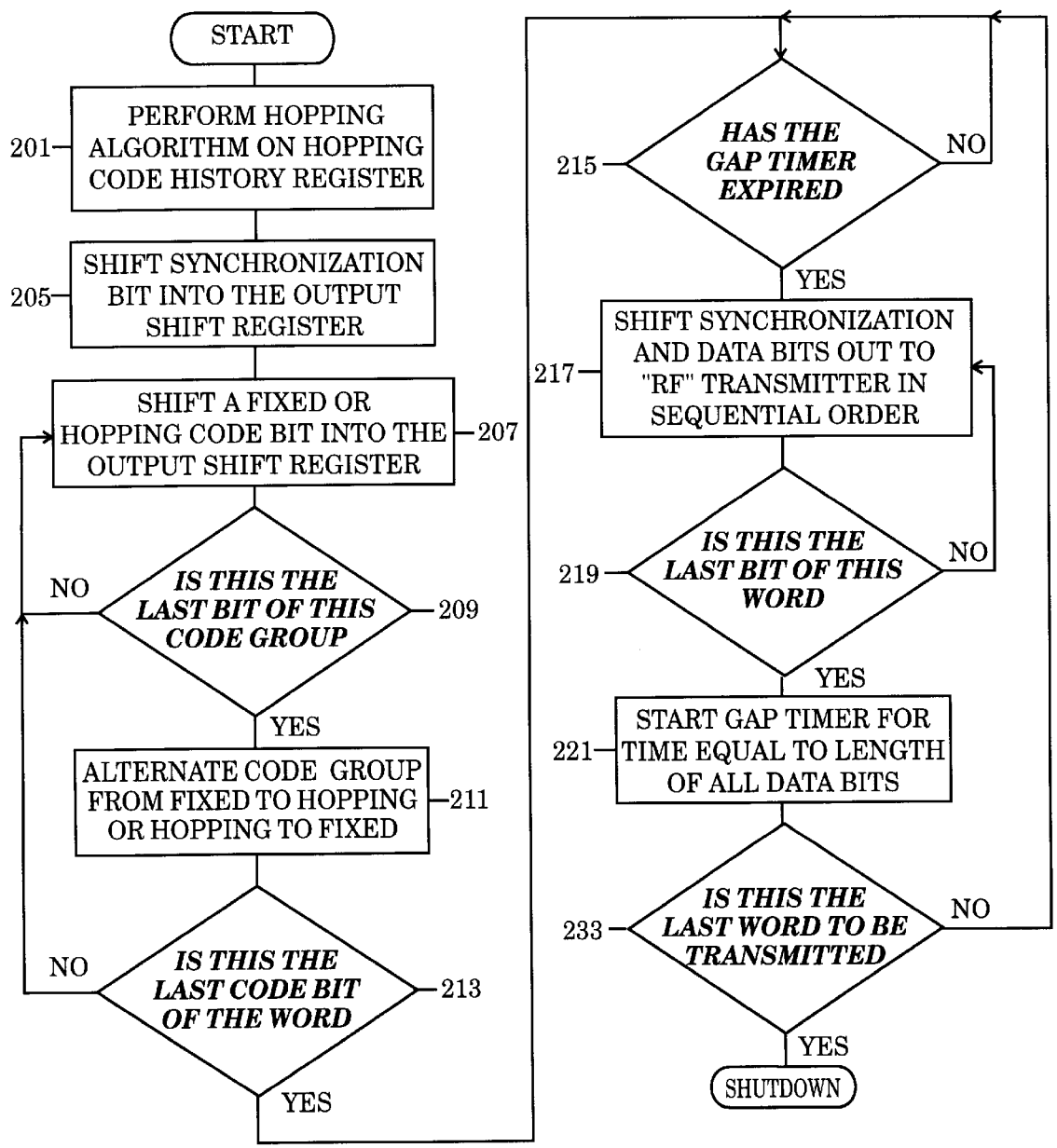
FIG. 3 is a flow chart for the system remote-control transmitter operation utilizing the conventional scrambled code hopping embodiment of the invention.

The operation of the conventional, scrambled/interlaced, code hopping remote-control transmitter 25 is flow charted in FIG. 3. Each time a switch (not shown) of remote-control transmitter 25 is depressed and/or otherwise activated, a new hopping code is generated by performing the predetermined hopping algorithm stored within remote-control transmitter 25. In the preferred embodiment, the hopping algorithm is a mathematical formula such as a multiplier or an adder or a subtractor. In other embodiments the hopping algorithm is a pseudo-random number generator. Yet in other embodiments, the hopping algorithm is a look-up table containing a series of binary words. The hopping algorithm is performed on a binary number stored in a history register of remote-control transmitter 25. This number is also stored in controller 35 or EEPROM 37. After the hopping algorithm is performed, the new hopping word is stored in the history register for subsequent retrieval and operation thereon. The hopping code algorithm is performed on the last word in the history register prior to each transmission at 201.

In the preferred embodiment, before transmissions commence, the code word is loaded into the output shift register beginning with synchronization bit at 205. Next, the code word is loaded by alternating between fixed and hopping or hopping and fixed code groups at 207 through 213. A bit is loaded at 207, then the encoder checks if this is the last bit of this code group at 209 as defined by the format word. If it is not, then the encoder returns to 207 to load another bit, but if it is the last bit, then the encoder proceeds to 211 where the encoder alternates the group from fixed to hopping or hopping to fixed, depending on the prior group. The next step is a determination of whether this is the last code bit of the code word at 213. If it is not, the encoder goes to 207 and if it is, the encoder proceeds to 215. When the output register is completely loaded, the encoder goes into a delay loop to wait until the gap is complete at 215. A gap timer is set to count down/decrement the time as defined by the gap time.

When the gap timer expires at 215, the entire code word is sequentially shifted out at 217 to drive the RF output section of remote-control transmitter 25 using predetermined clocked cycles of the encoder. This output drives the RF output oscillator/output transistor (not shown) in remote-control transmitter 25. This generates an RF signal that is detectable or receivable by RF receiver 33 of control module 29.

Since the bits are sequentially shifted out at 217, the encoder checks if each bit is the last bit in this word at 219. If it is not, the encoder goes back to 217 to shift out the next bit. If it is, the gap timer is set to a time necessary to comply with the system requirements and/or time necessary to process the next code word is then started at 221. If remote-control transmitter 25 button(s) is released or deactivated, then at 233 remote-control transmitter 25 shuts down. Remote-control transmitter 25 then idles or shuts off completely until one or more of remote-control transmitter 25 buttons is depressed or activated again.

CONTROLLER OPERATION

Figure 4:
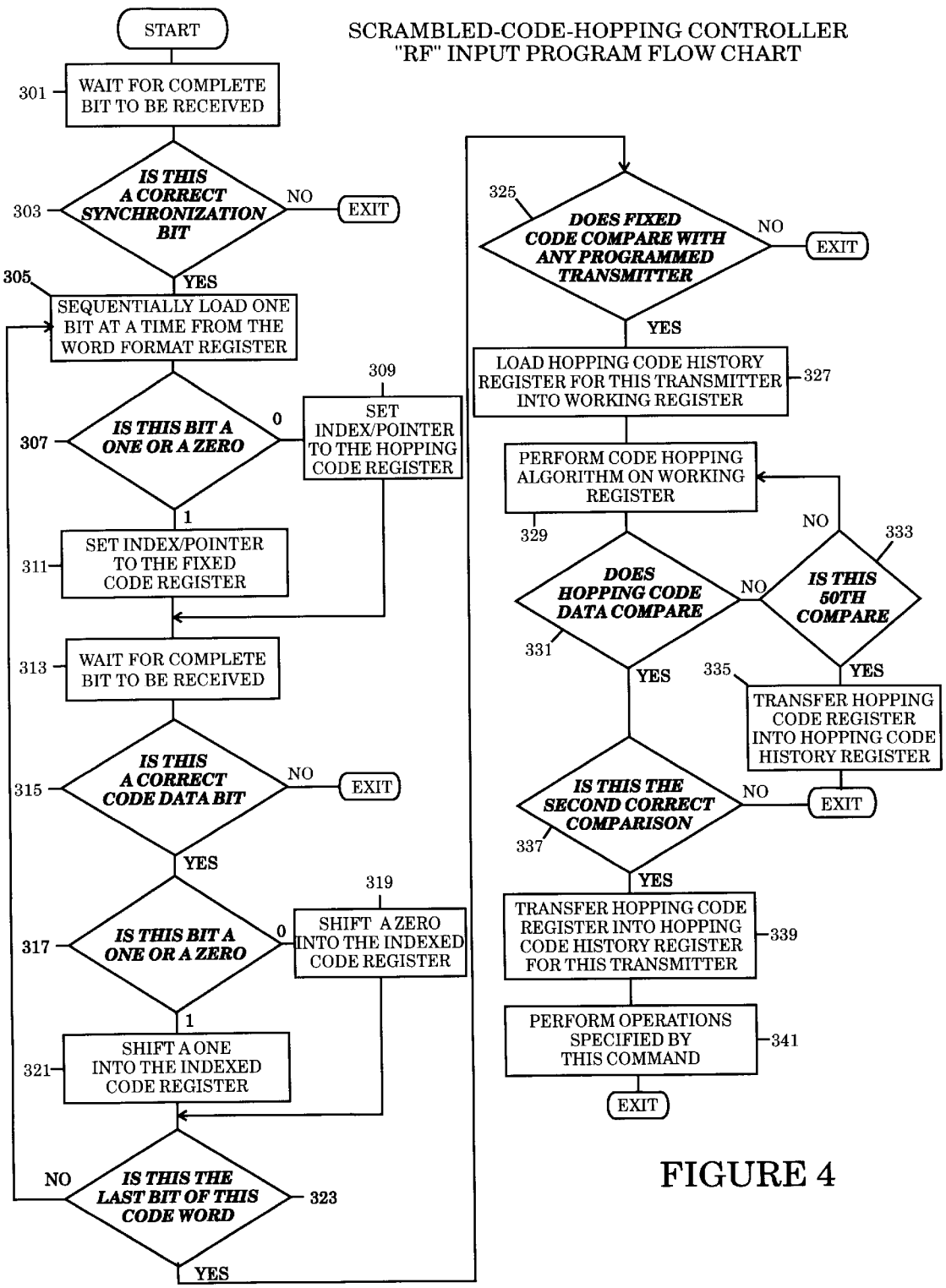
FIG. 4 is a flow chart for the system controller RF input operation utilizing the conventional scrambled code hopping embodiment of the invention.

FIG. 4 shows controller 35 input routine and program flow chart for a scrambled code hopping system. The transmitted code word is processed by control module 29, RF receiver 33, to supply logic zero or logic one data levels to controller 35. Controller 35 can process the incoming pulsewidth data from RF receiver 33 using several methods. One embodiment employs a frequent check method, where controller 35 checks frequently to see if RF data is present at its input from RF receiver 33. This could be as often as once every 5 to 10 microseconds, depending on the bit data rate of control module 29 and remote-control transmitter 25. This is one of the limiting factors of how fast data can be transmitted. Another limiting factor is the rise and fall times of the output of remote-control transmitter 25 and with the rise and fall time capability of RF receiver 33. Another embodiment provides for the RF input to generate an interrupt to controller 35 each time the data goes high and again each time the data goes low. This is a more efficient way of utilizing controller 35 and requires much less of controller 35 time because it eliminates the requirement of continuous checking of the RF input by controller 35. Either embodiment is equally effective.

One of the requirements of controller 35 is to determine how long the RF input is at logic zero and how long the RF input is at logic one. In the preferred embodiment, the code word length is 73 bit periods, where each bit has a duration of approximately 1.35 milliseconds. The code word of the preferred embodiment consists of one bit period for a synchronization bit, 36 bit periods for 36 code bits and 36 bit periods for gap. The preferred embodiment of this invention employs the pulse-width-modulation technique, which is known in the art. The synchronization bit of the code word follows the gap with a logic one input. This is followed by 36 code data bits where the duty cycle of the bit determines if it is a logic zero or a logic one. A bit period begins at the falling edge of the previous bit. A logic zero is represented by a bit having a duty cycle of one third low followed by two thirds high of the bit period and a logic one is represented by a bit which is two thirds low followed by a one third high of the bit period. The 36 code data bits are followed by a gap which is a dead period (no data is transmitted) equal to 36 bit periods. In other embodiments, the code word length may vary from two to n bits depending on the application.

FIG. 4 is a scrambled/interlaced code hopping controller program flowchart. In the preferred embodiment controller 35 first checks for a synchronization bit at 301 and 303 which follows gap. When the input goes high at 301, controller 35 waits for the high input to go low and at 303 checks if the bit high period is approximately equal to one third of the total bit period and is preceded by at least several bit periods of a low input. If it is a valid synchronization bit, then the first bit from the word format register is loaded at 305, to determine if the incoming bit is a fixed or hopping bit. At 307, the determination is made to set the index/pointer to the hopping register at 309, if the bit of the format word is a logic zero or to set the index/pointer to the fixed register at 311 if the bit of the format word is a logic one. In the preferred embodiment, these operations are performed during the low period of the incoming bit at 313, where controller 35 waits until the bit is high and again goes low signaling that the bit transmission is complete. If the bit period is too long or too short, then the bit is invalid or in error and at 315 controller 35 exits the RF input routine. At 317, controller 35 checks the duty cycle of the incoming code bit to determine if it is a logic zero (one third low followed by a two thirds high) or a logic one (two thirds low followed by a one third high). A zero is shifted into the respective fixed or hopping code register at 319 or a one is shifted into the respective fixed or hopping code register at 321 pursuant to the index/pointer set at 309 or 311. At 323, controller 35 determines if this is the last bit of the word. In one embodiment, controller 35 determines the presence of the last bit by counting the number of bits received. In an alternate embodiment controller 35 detects a prolonged physical low at its input. If this is not the last bit, then steps 305 though 323 are repeated until the receipt of the code word is complete.

When the receipt of the code word is complete, the fixed code portion (fixed word) of the code word is compared with all programmed remote-control transmitters 25 at 325 to determine if this is one of remote-control transmitters 25 programmed into the system. In the preferred embodiment the programmed or authorized transmitters are identified by comparing the fixed and/or hopping codes it sends to controller 35. When controller 35 compares the fixed code word portion with all the fixed words in its memory, EEPROM 37, it determines if the received fixed code was sent from remote-control transmitter 25 which is authorized to control or operate the alarm system.

Depending on the embodiment, the fixed code portion may contain no part, a part of, or the entire serial number or identification code of remote-control transmitter 25, wherein the identification code is particular to each remote-control transmitter 25 and is programmed by the manufacturer or is assigned by the user. In the embodiments which provide a part of or do not provide the serial number or identification code of remote-control transmitter 25 within the fixed portion of the code, the remainder of the serial number may be contained in the hopping code portion (hopping word) of the code word. If controller 35 matches the fixed code word of remote-control transmitter 25 within its memory device, such as EEPROM 37, then the process of checking the hopping code commences at 327 by loading the hopping code history register which contains the last hopping code portion received from the last transmission from this particular remote-control transmitter 25. At 329, controller 35 performs the hopping algorithm which is contained in or is controlled by the fixed portion of the code word or in the alternative is preassigned to controller 35 and remote-control transmitter 25. This algorithm is performed on the hopping code portion of the code word which was stored in the history register. The result of the algorithm is temporarily placed in the working register. Then, the newly received or last received hopping code portion stored in the hopping code register is compared at 331 with the resulting word in the working register. In the event the two words do not compare, then at 333 controller 35 goes back to 329 and performs the algorithm again on the word in the working register and compares the result with the received code word. In the preferred embodiment controller 35 will perform this process up to 50 times in search of a match. In other embodiments the process may be repeated from 1 to x times. This is necessary as remote-control transmitter 25 may have been inadvertently activated outside the range of controller 35. If remote-control transmitter 25 was activated outside the system range, the 50 step search should be sufficient to catch up with remote-control transmitter 25. If at 333 it is the 50th comparison then the hopping code register is transferred into the history register after which controller 35 exits the routine and awaits the next transmission. This provides for the capability to re-synchronize or match with the next transmission, since it is apparent that after 50 comparisons a match is not probable.

If at 331, the hopping code data does compare, then controller 35 checks at 337 if this is the second comparison. The second comparison is provided in the preferred embodiment as an additional security measure. More or less comparisons may be used in alternate embodiments. In the event controller 35 does not find two valid comparisons, it will exit the RF input routine to wait for a second correct word to be input. In the preferred embodiment the twice matched hopping code word will be stored in the hopping code history register at 339. Thereafter, the specified command of this transmission of this code word will be carried out at 341. Thereafter, controller 35 returns to the normal program dependent on the command performed at 341.

PROGRAMMING OF REMOTE-CONTROL TRANSMITTER AND CONTROLLER

The programming of transmitters 25 to controller 35 is unique. One embodiment of this invention employs a master-fixed-code remote-control transmitter 25. Another embodiment employs two unique transmitters. These embodiments are discussed in the subsequent portion of this disclosure. The programming routines of these embodiments are discussed below and their flow charts are found in FIGS. 5, 9 and 10.

Regardless of the embodiment employed, for conventional code scrambling, both transmitter 25 and controller 35 must employ the same format word, initial hopping word and hopping algorithm to perform properly. In one embodiment, transmitter 25 programming into a particular alarm system and controller 35 is initiated by a preset manipulation of system inputs. Multiple channels or commands may be activated from a single remote-control transmitter 25 by manipulation of remote-control transmitter 25 user controlled switches. A system channel controls specific commands executed by controller 35 and initiated by the user/operator through remote-control transmitter 25. Each particular channel of system 29, shown in FIG. 1, is separately programmed with the same remote-control transmitter 25. Therefore, system 29 will be responsive to all remote-control transmitter 25 channel activations and commands. In the preferred embodiment of this invention, a separate remote-control transmitter 25 identification code is programmed for each channel. In other embodiments, remote-control transmitter 25 identification code may be programmed once to program all remote-control transmitter 25 channels into the system.

Once controller 35 enters a learn mode, it accepts the format word from transmitter 25 being programmed and it accepts an initial 0-times modified hopping word, which will be associated with an identification code particular to this transmitter 25. Controller 35 may also accept a hopping algorithm from the transmitter. Further embodiments and examples of controller and transmitter programming will be discussed below.

DESCRIPTION OF MASTER-FIXED-CODE HOPPING

A more advanced way of scrambling/interlacing transmissions is to use a master-fixed-code. In one embodiment, master-fixed-code may contain a part of an algorithm that establishes the number, sequence, and/or length of all the groups of the fixed and the hopping codes. Master-fixed-code may also contain a serial number that allows controller 35 to use a look-up table contained in a memory device, such as EEPROM 37, which is accessible or local to controller 35, to set the number, sequence, and/or length of all or part of the groups of the fixed and hopping codes. In another embodiment, the master-fixed-code may be a part of hopping algorithm or a mathematical algorithm, where the algorithms are known to controller 35. Master-fixed-bits must be in predetermined locations in the code word to allow the decoder of control module 29 or controller 35 to read transmitter 25 serial number or hidden code (algorithm).

Controller 35 must have the capability to learn the master-fixed-codes, store them, recognize the proper learned code, and to re-synchronize to a learned code if synchronization is lost.

THEORY OF OPERATION FOR MASTER-FIXED-CODE SYSTEMS

Figure 5:
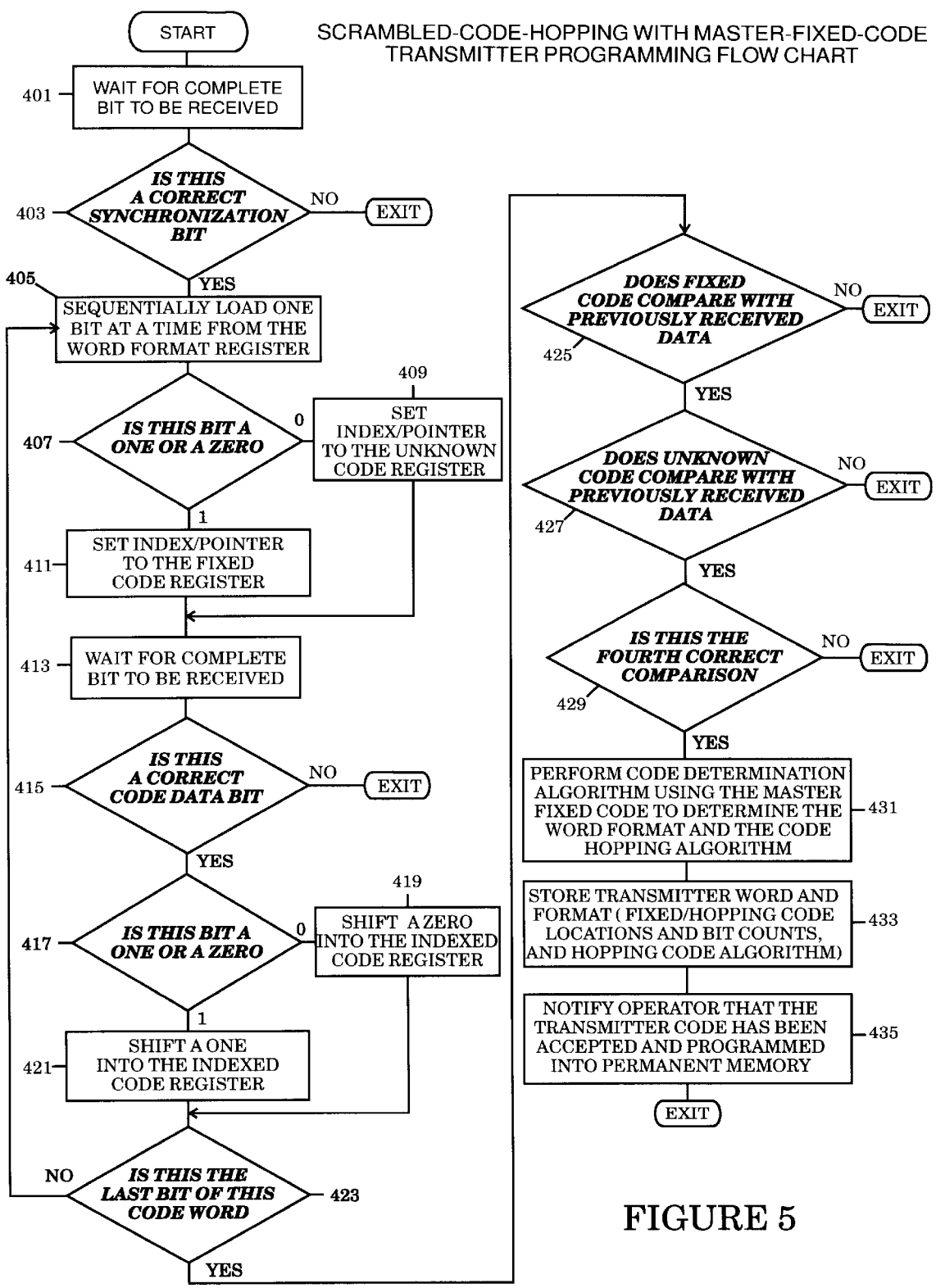
FIG. 5 is a flow chart for the system transmitter operation utilizing the master-fixed-code scrambled code hopping embodiment of the invention.

In the conventional scrambled code hopping embodiment of this invention, the code word is transmitted with the hopping word and the fixed word. The code word is scrambled or interlaced as described above. For the decoder of controller 35 to identify and sort which bits are fixed bits and which are hopping bits, format word is provided to controller 35. It indexes or directs the incoming bits of the code word to either the fixed code register or the hopping code register which are local to controller 35. In the embodiment heretofore described, the format word is programmed by the manufacturer or the user. However, to achieve a higher level of security, this embodiment of the invention provides a format word which is different from transmitter to transmitter and from system to system. The preferred embodiment of the master-fixed-code technique is described immediately below and is shown in FIG. 5.

Master-fixed-code is a partial subset of all the fixed bits transmitted by remote-control transmitter 25 and it is provided by the manufacturer as a series of 12 bits in a code word having a 36 bit length. In other embodiments the master-fixed-code may range from 1 to n bits, where n is less then the length of the code word. Master-fixed-code locations are programmed in a memory device accessible by controller 35, such as EEPROM 37, in a master-fixed-code format word. It is necessary to determine the location of the remaining fixed bits and hopping bits to operate the system and to accept commands from remote-control transmitter 25.

To provide controller 35 with the format word for the particular remote-control transmitter 25 and controller 35 are set to a program routine or a learn mode by a predetermined manipulation of their inputs. When remote-control transmitter 25 is activated by depressing a button sequence therein, the code word is transmitted to controller 35. Controller 35 sorts or indexes the master-fixed-code bits and the unknown bits, which contain some fixed and some hopping bits, into master-fixed-code and unknown code registers. Thereafter controller 35 performs a predetermined and programmed master-fixed algorithm on the bits within the unknown code register. This algorithm may be one of many. In one embodiment, the master-fixed-bits are a multiplier to a number stored within EEPROM 37 or a memory device accessible to controller 35. In another embodiment the master-fixed algorithm is a look-up table having a number of binary digital words therein. Yet in another embodiment the master-fixed algorithm is a pseudo-random number generator. The result of this algorithm is then combined with the master-fixed-code bits so that the master-fixed-code bits retain their respective position and binary value within the code word. The bits which are generated by the format algorithm, along with the master-fixed-code bits in their original position, comprise a format word. The format word logic one bit values indicate the locations of fixed bits and logic zero values indicate the locations of hopping bits. Thus, the format word from the master-fixed-code is determined by controller 35 is provided by and transmitted from remote-control transmitter 25.

As a way of example, a theoretical format word for a master-fixed-code in a 24 bit code word is set to 000010000010000000100000. It is noted that the master-fixed-code of this word has a binary value of 5 and the master-fixed-code bits are the 5th, 11th and 19th bits of the word. Remote-control transmitter 25 transmits its initial code of 101110111101111000110101. It is known to controller 35 that the 5th, 11th and 19th bits are fixed bits. It is not known how many more bits are fixed and which bits are fixed and which bits are hopping because at this point there is no complete format word available to controller 35 for this remote-control transmitter 25. To determine the format word controller 35 performs three steps. Controller 35 removes the master fixed bits from the code received from remote-control transmitter 25. In the present example the resulting word is 101101111111100010101. Next, the controller performs a master-fixed-code algorithm assigned to it by the manufacturer. In the preferred embodiment the master-fixed-code algorithm uses the master-fixed-code as a part of its algorithm. An example of using the master-fixed code as part of master-fixed-code algorithm is using the binary value of the master-fixed-code as a multiplier or a pointer in a look-up table with binary words therein. The resulting word (after performing the master-fixed-code algorithm) may be 110111000111101011001. Next and final step is to reinsert the master-fixed-code bits into this word which provides for: 110111101001110101111001. This is the format word which will provide controller 35 with the ability to index or sort fixed and hopping codes. Each logic one represents the location of a fixed bit within a code word and each logic zero represents the location of a hopping bit within a code word. This format word is stored in memory along with the normal transmitter code word for later retrieval. The operation of the master-fixed-code technique is described in a flowchart of FIG. 5 and discussed in more detail immediately below.

MASTER-FIXED-CODE CONTROLLER LEARN ROUTINE

In the flowchart of FIG. 5, controller 35 waits for a complete bit to be received from remote-control transmitter 25 at 401. At 403 it is determined whether the received bit is a correct synchronization bit. If it is not, then controller 35 exits the RF input routine to wait for another bit. If it is a correct synchronization bit, then at 405 controller 35 sequentially loads one bit at a time from the master-fixed-code word format register to provide for the location of the master-fixed-code bits within a code word. This provides for the indexing and sorting of the incoming master fixed bits and the yet unknown bits (location of fixed and hopping bits not yet known to controller 35). At 407 controller 35 checks the logic bit value of the master-fixed-code format bit. If it is a logic zero, controller 35 sets the index to the unknown register at 409 and if it is a one controller 35 sets the index to the master fixed code register at 411. Control module 29 waits for the input bit of the incoming code word to be completed at 413. When it is complete, then at 415 controller 35 checks if it is a valid data bit, and if it is not, the system exits the RF input routine to wait for another RF word to be received. If the bit is a valid data bit (the bit is not too long or too short), then at 417 controller 35 checks the duty cycle of the bit to determine if the bit is a logic zero or a logic one. If the duty cycle falls within the duty cycle timing allowed for a logic zero, then at 419 a zero is loaded or shifted into the indexed-code-register as directed by the master fixed code (either the fixed code register or the yet unknown hopping code register). If the duty cycle falls within the duty cycle timing allowed for a logic one, then at 421 a one is loaded/shifted into the indexed code register. At 423, the determination is made if this is the last bit of this code word and if it is not, steps 405 through 423 are repeated until it is.

In the preferred embodiment, as a measure of assurance, the entire incoming code word is transmitted to the system until such time as the system has an opportunity to compare the received code word four times. This provides for extra assurance that the programmed code word is correctly received. The master-fixed-code is compared with previously received fixed code at 425 and if there is no match, the RF input routine is exits to wait for another RF input word. If the code data compares, the unknown code data is compared with previously received unknown code data at 427, and if there is no match the RF input routine is exits. In the preferred embodiment four comparisons are performed. In other embodiments 1 to n comparisons may be performed. If the unknown data matches, a data match register (not shown) is incremented and checked to determine if this is the fourth correct comparison at 429. If it is not a fourth correct comparison controller 35 exits to wait for another RF code word.

When the fourth comparison is correct at 429, then at 431 the master-fixed-code is used with the master-fixed-code algorithm to determine the entire word format (the total fixed and hopping bit sequences, locations, and counts) and/or the hopping algorithm. As described throughout this specification, the master-fixed-code algorithm may be one of several, including a mathematical formula or a look-up table. In sum the master-fixed-code algorithm must provide a binary word different from the binary word this algorithm is performed on. In the preferred embodiment the master-fixed-code is used in conjunction with the master-fixed-code algorithm. As an example, if the binary value of the master-fixed-code is 5 and the master-fixed-code algorithm is a simple multiplier, then the received code word will be multiplied by 5. In another example, if the master-fixed-code algorithm is a pseudo-random number generator and the master-fixed-code word value is 5 then the pseudo-random number generator will be executed five times. In other embodiments of the invention the master-fixed-code is not a part of the hopping algorithm.

At 433, the format word and the fixed and hopping words are stored in EEPROM 37 along with the hopping algorithm, if each remote-control transmitter 25 has a unique hopping algorithm. At 435, the user/operator is notified with audible and/or visual signal(s), that remote-control transmitter 25 codes have been accepted and programmed into memory, after which controller 35 exits the RF input routine and waits for additional remote-control transmitters 25 to be programmed therein or for the remote-control transmitter 25 programming routine exit.

MASTER-FIXED-CODE SYSTEM CONTROLLER OPERATION

Figure 6:
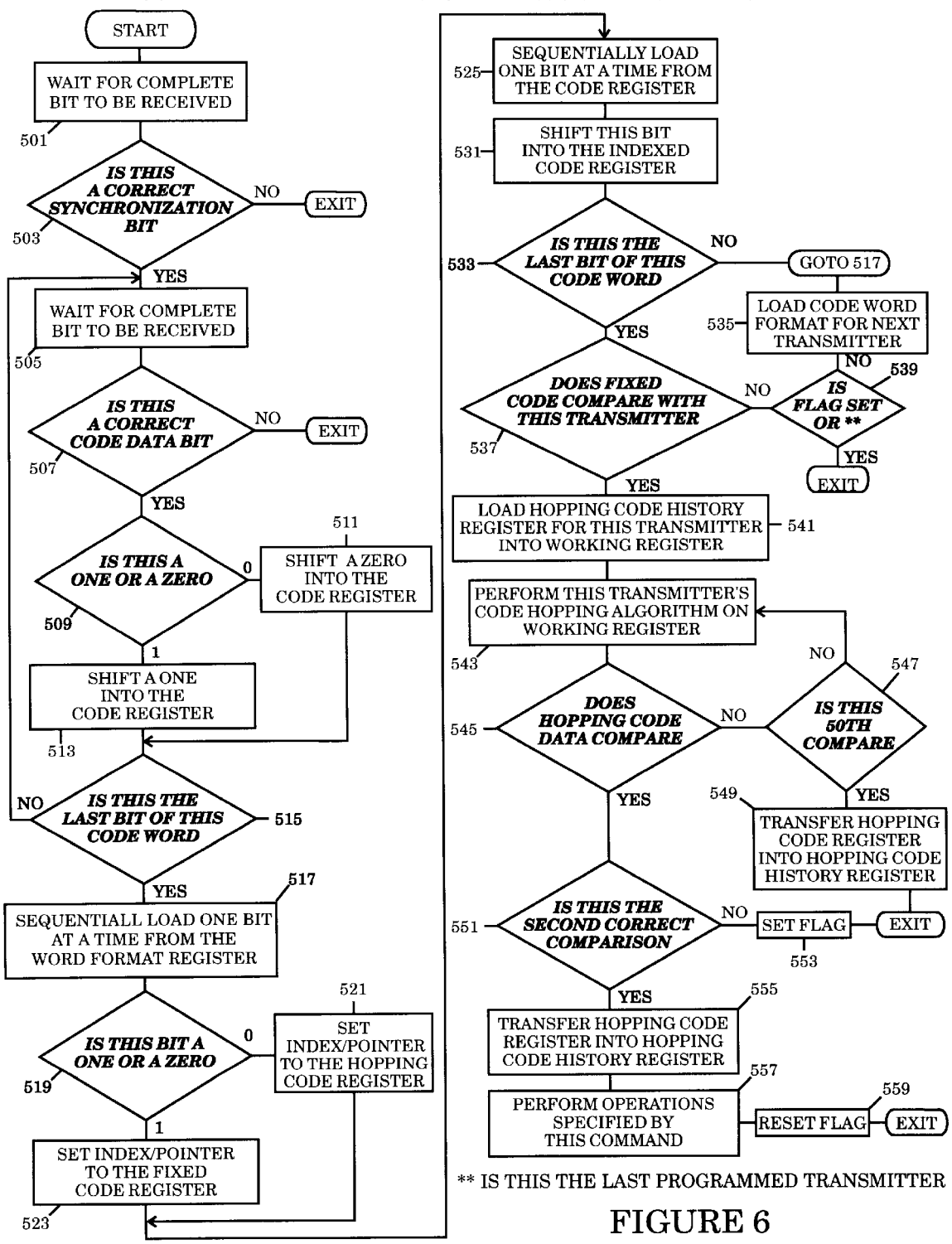
FIG. 6 is a flow chart for the system controller RF input routine program using the master-fixed-code scrambled code hopping embodiment of the invention.

FIG. 6 is the program flow chart that allows controller 35 to recognize master-fixed-code hopping remote-control transmitters 25 that are programmed into the system and are therefore authorized or enabled to operate the alarm system. One of the key differences between this operation and the conventional scrambled code operation is that the code word is first input or placed into a code register, then sorted into the fixed and hopping registers. This is necessary because the format word is different for each remote-control transmitter 25. Therefore, controller 35 must first identify the specific remote-control transmitter 25 which issued or sent the transmission then reference that particular remote-control transmitter 25 hopping code to be able to decipher its code word. To achieve the recognition of the particular remote-control transmitter 25 which sent the command the code word may need to be sorted several times and compared with the fixed code from each of remote-control transmitters 25 stored or programmed into controller 35 until a match is achieved before proceeding to check the hopping code. In the preferred embodiment, the most recently used remote-control transmitter 25 is checked first because it is likely that the user which uses the vehicle most sent this particular transmission. If no match is found, then the next most recently used remote-control transmitter 25 is checked and the cycle is repeated until a match is found or all programmed transmitters 25 are checked. In the preferred embodiment, if programmed remote-control transmitter 25 code is matched once, then a controller flag is set at 553 such that only that remote-control transmitter 25 will be checked until a second code is matched or transmissions cease. The preferred embodiment provides for improved efficiency because a corrupt or bad transmission will not upset the order of the last correct received word and will not require controller 35 to start the process anew at 501.

At 501 in FIG. 6, controller 35 waits until a complete bit is received. Then at 503, a check is made to determine if it is a valid code word synchronization bit. If it is not, then controller 35 exits the RF input routine and waits for a correct remote-control transmitter 25 code word synchronization bit at the beginning of a new code word. If it is a valid synchronization bit, then controller 35 waits at 505 for a complete data bit to be received. At 507, controller 35 checks if the bit received is a valid data code bit and if it is not, controller 35 exits the RF input and waits for a new word to begin at 501. If the bit is valid (the bit is not to long or to short), then at 509 controller 35 checks the duty cycle of the bit to determine if the bit is a logic zero or a logic one. If the duty cycle falls within the duty cycle timing allowed for a logic zero, then at 511 a zero is loaded (shifted) into the code register. If the duty cycle falls within the duty cycle timing allowed for a logic one, then at 513 a one is loaded (shifted) into the code register. At 515, a check is made to determine if this is the last bit of this word, and if it is not, then steps 505 through 515 are repeated until a complete code word is received.

When a complete code word is received, the format word for the most recently used remote-control transmitter 25 is loaded one bit at a time at 517 to be used for indexing the coded data just received into the fixed and hopping code registers for comparison with programmed remote-control transmitters 25. At 519, a bit from the word format register is used to set the index to the hopping code register if it is a logic zero at 521 and to the fixed register if it is a logic one at 523. The most recent received code data is compared one bit at a time at 525, and loaded/shifted into the indexed fixed or hopping code register at 531 as indexed or sorted by the format word. At 533, a check is made to determine if this is the last bit of this word, and if it is not, then steps 517 through 533 are repeated until it is.

In the preferred embodiment, upon receipt of a code word, this code word is completely indexed or sorted into its respective fixed and hopping registers by employing the format word of the last used transmitter. At 537 the fixed code or identification code or the serial number, depending on the preference of the manufacturer, is compared with programmed remote-control transmitter 25 fixed code most recently used. This provides for last in first used que. If identification code does not compare, then a check is performed at 539 to determine if this code successfully previously compared within this transmission (the flag is set). If the flag is set or this is the last programmed remote-control transmitter 25, then the RF input routine is exited to wait for another transmission and another code word from this remote-control transmitter 25, because an assumption is made that the prior transmission was corrupt or was issued by an unauthorized remote-control transmitter 25.

If remote-control transmitter 25 has not previously compared and therefore the flag is not set, or it is not the last programmed remote-control transmitter 25, then the format word for the next previously used remote-control transmitter 25 is loaded at 535, and a new sort is performed on the just received code word, which was stored in the code register upon its receipt. This is compared with this programmed remote-control transmitter 25 by rerunning to steps 517 through 537. If at 537 a correct comparison is made, then at 541 the hopping code history register is loaded into the working register for comparison at 545 with the hopping code data just received after the code hopping algorithm is performed on it at 543. In one embodiment of this invention one or more fixed bits of the code word are employed by the hopping code. If the data does not compare, then at 547, a check is made to determine if this the 50th incorrect comparison. If it is not the 50th incorrect comparison, the code hopping algorithm is performed again at 543 and the data is again compared at 545. If it is the 50th incorrect comparison, hopping code register is transferred into the hopping code history register at 545, after which controller 35 exits the RF input routine to wait for a new transmission from this remote-control transmitter 25. This allows for re-synchronization of the transmitted code from remote-control transmitter 25 to controller 35. As mentioned above this condition is possible because remote-control transmitter 25 may have been activated outside of control module 29 operating or receiving range.

If at 545 the hopping word does compare with the word generated by controller 35, then at 551 a check is made to determine if this is a second correct comparison. If it is not a second correct comparison, then a flag is set at 553, so that this will be the only remote-control transmitter 25 checked during this transmission. Additionally, if the flag at 553 is set, the system exits to wait for another transmitted code word from remote-control transmitter 25. If this is a second correct comparison, then the hopping code register is stored in the hopping code history register at 555. The operation(s) specified by this remote-control transmitter 25 command is/are performed at 557 and the flag is reset at 559, after which controller exits to the appropriate operating routine.

FIRST REMOTE TRANSMITTER OPERATION

Figure 7:
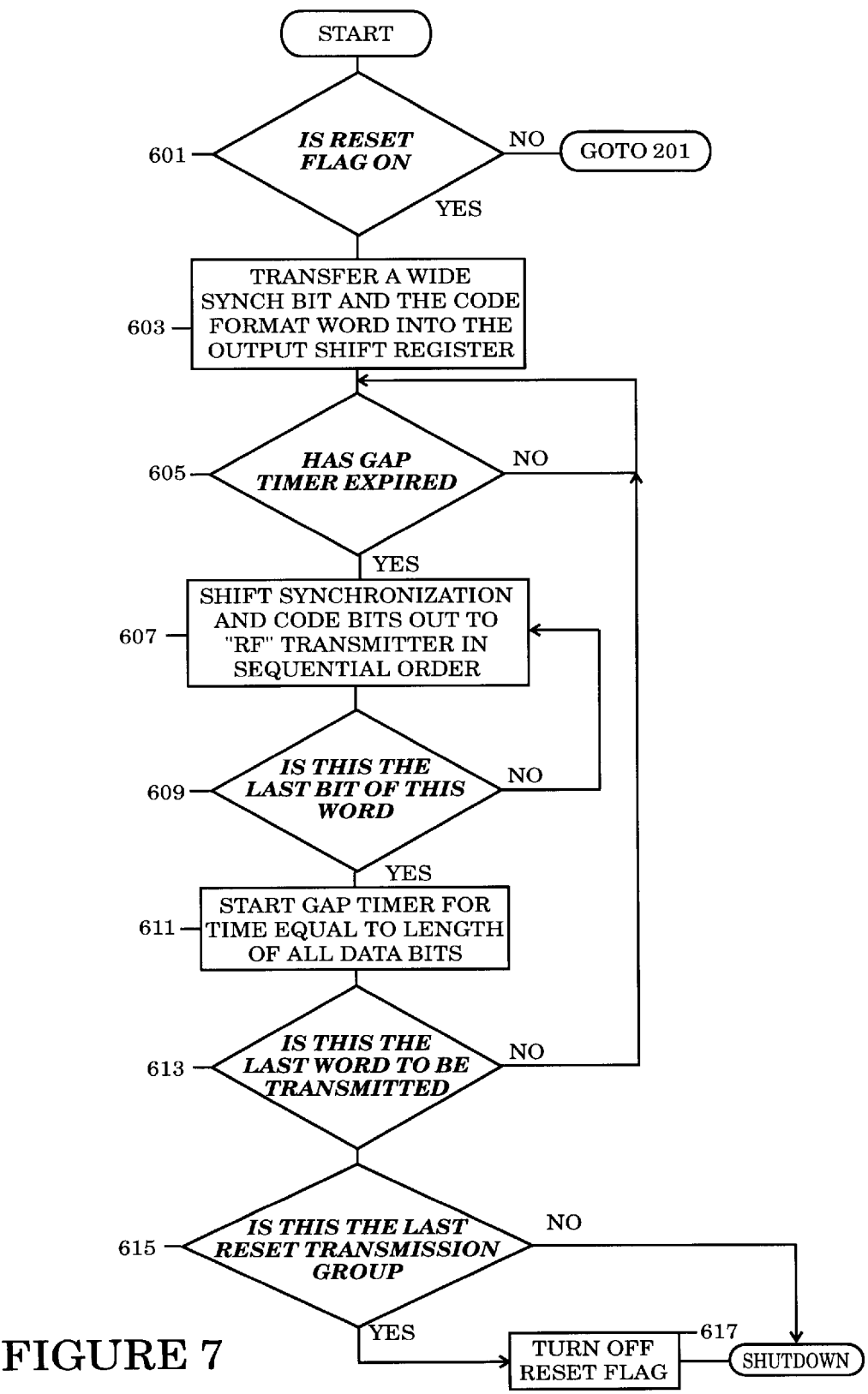
FIG. 7 is a flow chart for the first unique system remote-control transmitter learn program.
Figure 8:
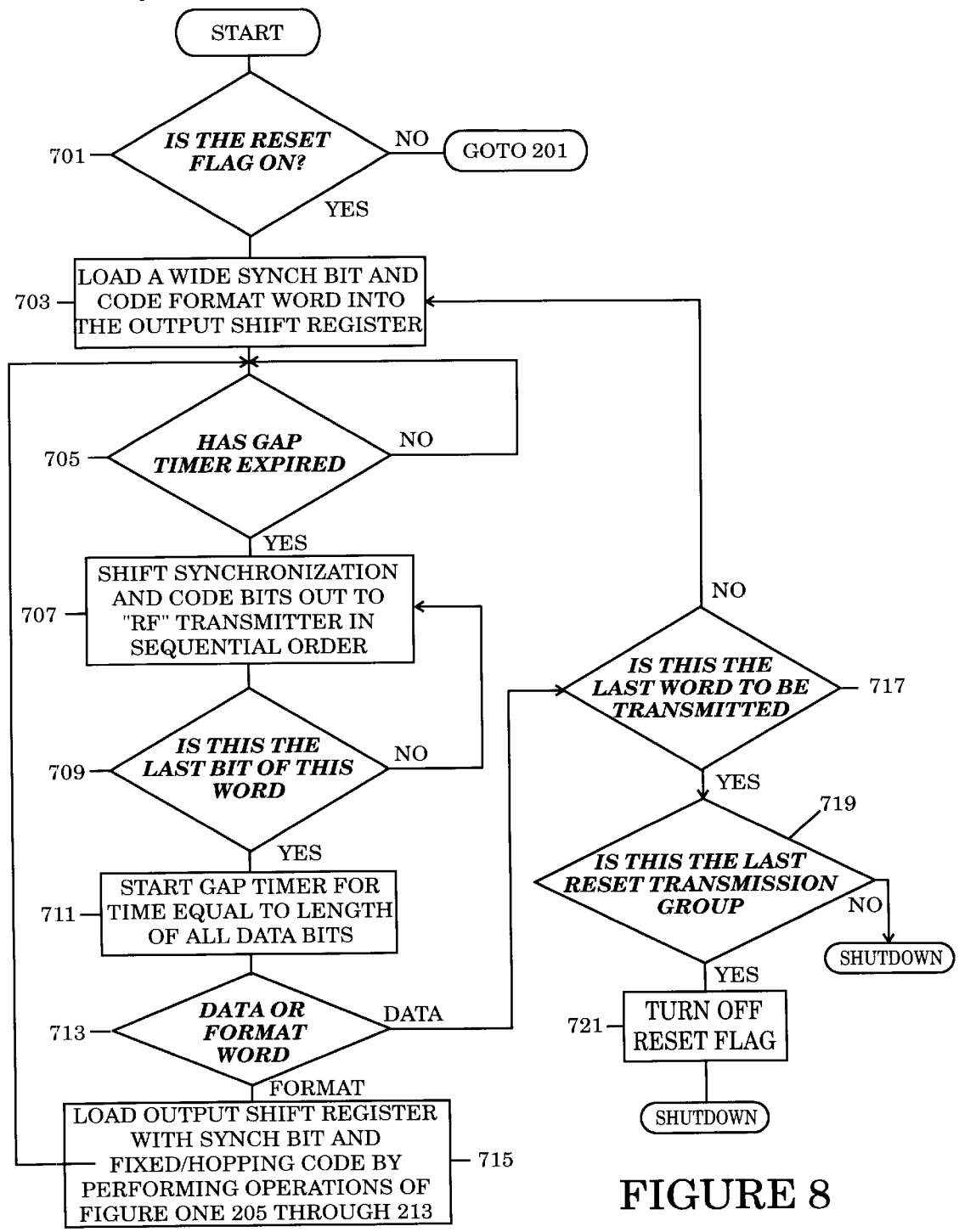
FIG. 8 is a flow chart for the second unique system remote-control transmitter learn program.

FIG. 7 is a flow chart of the operation of the first of two unique scrambled code hopping remote-control transmitters 25 and FIG. 8 is a flow chart of the operation of the second unique scrambled code hopping remote-control transmitter 25. These remote-control transmitters 25 are unique because controller 35 is not preprogrammed and does not have any format word or word length information for transmitters 25; therefore, it becomes necessary for remote-control transmitter 25 to transmit its format word to controller 35 during the learn routine. As described above, in the preferred embodiment, this is accomplished by resetting remote-control transmitter 25 by removing its battery, or by a predetermined manipulation of remote-control transmitter 25 control switches. In the remote-control transmitter of this embodiment, a flag is set therein to signify that its format word must be sent to controller 35.

In the preferred embodiment, as shown in FIG. 7, unique remote-control transmitter 25, type one, after being reset, will transmit only the format word for one or more transmission cycles. The number of cycles may be determined at time of manufacture of transmitter 25 encoder and is not dispositive to the operation of this invention. The number of transmission cycles may vary from 1 to n, depending on the preference of the manufacturer and the requirements of an application. The number of transmission cycles is loaded into a transmission cycle counter of remote-control transmitter 25 when the reset flag is turned on. This format word will contain the location of the fixed and hopping bits in the code word. In the preferred embodiment, the format word is separated or distinguished from the code word by its particular synchronization bit which is different from the synchronization bit of the code word. In the preferred embodiment, the synchronization bit of the format word will have a high period equal to two thirds of a bit period instead of the normal one third.

At 601 in FIG. 7, a check is made to determine if a reset flag is on. If the reset flag is not on, then remote-control transmitter 25 proceeds to step 201 of FIG. 3 to perform normal remote-control transmitter 25 code transmission. If at 601 the reset flag is on, then the format word (chosen or programmed as above) will be loaded into an output shift register at 603 of remote-control transmitter 25. A check will be made at 605 to determine if the gap timer has expired, and if it has not, a wait loop is established until the timer expires. When the timer expires, at 607, the synchronization and code bits are sequentially shifted out to drive the RF transmission portion of remote-control transmitter 25, one bit at a time. At 609, a check is made to determine if this is the last bit of the code word and at the end of this code word, a gap timer is set and restarted at 611. At 613, a check is made to determine if remote-control transmitter 25 control switch has been released. If it has not been released, steps 605 through 613 are repeated until the switch is released. At 615, when the switch is released, the transmission cycle counter is decremented and checked for numeric zero value and if it is not at zero, remote-control transmitter 25 shuts down without turning off the reset flag. If the counter is at zero, then at 617 the reset flag is turned off before remote-control transmitter 25 shuts down.

SECOND REMOTE TRANSMITTER OPERATION

The second unique scrambled code hopping remote-control transmitter 25 encoder flowchart is shown in FIG. 8. This is a type two remote-control transmitter 25. This remote-control transmitter 25 transmits a code format word and a normal remote-control transmitter 25 code word, alternately, during one or more transmission cycles after transmitter is reset, as described above. This sets the reset flag, and initiates the learn routine for this remote-control transmitter 25. The code format word will have a synchronization pulse with a high period equal to two thirds of a bit period to allow controller 35 to distinguish between the code format word and the normal remote-control transmitter 25 code word. This is necessary to prevent cross wording during remote-control transmitter 25 learn routine because transmission of an incorrect word could place controller 35 out of synchronization with remote-control transmitter 25. Without different or distinguishable synchronization bits, a format word could be read as the code word of remote-control transmitter 25 or the format word, thereby crossing or corrupting the actual remote-control transmitter 25 programming.

In FIG. 8 at 701, the encoder checks if the reset flag is on and if is not on, the remote-control transmitter proceeds with normal operations at 201. If the reset flag is on, then at 703 the encoder loads the format word synchronization bit and the code format word into the output shift register. When the register is completely loaded, at 705 the encoder checks if the gap timer has completed its cycle, and if it has not, then the encoder goes into a wait loop until the gap timer has expired. At expiration of the timer, the encoder starts shifting the code word out to the RF section of the remote-control transmitter 25 at 707, which transmits the code word to control module 29 or controller 35 for decoding. At 709, the encoder checks if the last bit of the word has been sent, and if it has not been sent, then the encoder returns or proceeds to 707 to shift out the next bit. In the preferred embodiment, if it is the last bit of the code word, then the gap timer is set to a time equivalent to all the bit periods of all remote-control transmitter 25 code word bits and restarted at 711. In other embodiments the gap timer may be set from 0 to n milliseconds. At 713, the encoder checks if the word just transmitted is a code word or a format word in order to alternate the output words and their respective synchronization bits. If the last word was a format word, then the code word is loaded into the output shift register at 715. The encoder then proceeds to the gap check at 705. If the last word transmitted was a code word, then the encoder checks or determines if this is the last word to be transmitted at 717 by checking if remote-control transmitter 25 switch is released. If it is not the last word to be sent, i.e. transmission is not complete, it proceeds to 703 to load another format word for transmission. If it is the last word to be transmitted, then at 719 the encoder checks if this is the last flag reset transmission group to be transmitted. If it is not, then remote-control transmitter 25 shuts down without turning off the reset flag. If it is, then at 721, the reset flag is turned off before remote-control transmitter 25 shuts down.

PROGRAMMING THE CONTROLLER USING TYPE ONE REMOTE TRANSMITTER

Figure 9B:
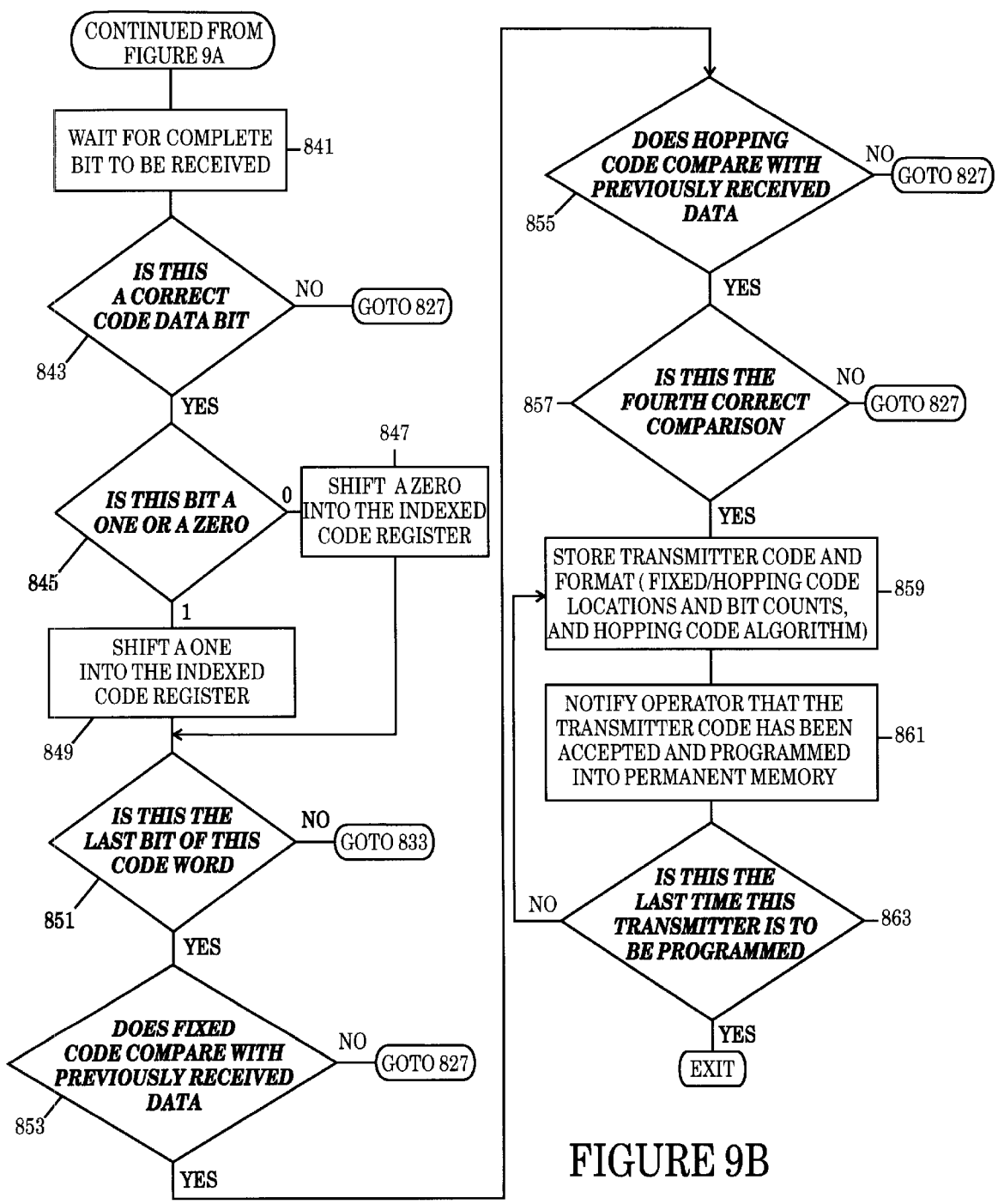

FIG. 9 shows remote-control transmitter 25 programming flow chart for scrambled code hopping with unique remote-control transmitters 25, type one. Both unique remote-control transmitter 25 types require that controller 35 have a learn routine program to learn the remote-control transmitters 25. In this embodiment, remote-control transmitter 25 transmits the code format word only for a predetermined number of transmission cycles. Remote-control transmitter 25 type one and type two have the capability to transmit its format word for more than one transmission period thereby allowing a given remote-control transmitter 25 to be programmed into multiple controller slots, without requiring the remote-control transmitter 25 to be reset in between each controller slot. This also allows for deleting or overwriting of obsolete or lost remote-control transmitters 25 which are no longer used with the system. Additionally, if remote-control transmitter 25 fails to program into controller 35 within or during the first transmission period, remote-control transmitter 25 employs the capability to stop the transmission and restart it.

If there is no requirement to program remote-control transmitter 25 into multiple slots of control module 29 and the first format word transmission is accepted into the system programming, then remote-control transmitter 25 can be cycled on and off by the operator until the format word transmission cycles are completed. This does not create a problem, because the synchronization bit must be correct for a word to be accepted into either the format word register or the fixed and hopping code registers, while programming the words transmitted by remote-control transmitter 25.

At 801 of FIG. 9, controller 35 waits for a complete bit to be received. At 803, controller 35 checks if the bit received is a correct format word synchronization bit. If the high segment of the bit is too long or too short, as may be caused by RF or receiver noise or interference, then controller 35 exits the RF input routine and waits for another input. If the bit is a valid format word synchronization bit, then controller 35 waits for another complete bit to be received at 805. At 807, the bit just received is checked for validity and if it is not valid (too long or too short), controller 35 exits the RF input routine. If the bit is valid (not too long or too short), then at 809 controller 35 checks the duty cycle of the bit to determine if the bit is a logic zero or a logic one. If the duty cycle falls within the duty cycle timing allowed for a logical zero, then at 811 a zero is loaded (shifted) into the word format register. If the duty cycle falls within the duty cycle timing allowed for a one, then at 813 a one is loaded (shifted) into the word format register. At 815, controller 35 checks if this is the last bit of this word and if it is not, then controller 35 will repeat steps 805 through 815 until it is the last bit, at which time controller 35 will proceed to 817. At 817, controller 35 compares the format word just received with previously received words, which are stored in a temporary register, to determine if there is an exact match, and if there is not, then controller 35 will exit the RF input routine to wait for another word to be transmitted from remote-control transmitter 25. In the preferred embodiment, if the word compares with previously received data, then at 819 controller 35 checks if this is the fourth correct word received. In other embodiments the number of compares may vary from 1 to n times. If it is not the fourth correct word, then controller 35 checks if this remote-control transmitter 25 format word has already been stored in memory, at 821. If this remote-control transmitter 25 format word has not already been stored in memory, then controller 35 exits the RF input routine and waits for another word to be transmitted. If this remote-control transmitter 25 format word has already been stored in memory, then controller 35 proceeds to 827 and waits for another unknown type of synchronization bit to be transmitted, i.e. a format word or a code word. If this is the fourth matching format word, then at 823 controller 35 stores the format word in memory for this remote-control transmitter 25 and notifies the operator that the format word has been accepted and stored into memory. At 825 controller 35 waits for remote-control transmitter 25 transmissions to cease before it proceeds to 827 to wait for a new transmission to begin.

At 827 of FIG. 9, controller 35 waits for a complete bit to be received, the input to go high at the end of gap and then to go low. When the bit is complete, controller 35 at 829 and 831 checks if it is a valid synchronization bit, and if it is not a valid synchronization bit, then controller 35 goes back to 827 to wait for another valid synchronization bit to be transmitted. At 831 if it is a valid format word synchronization bit controller 35 proceeds to 805 to start the input of another format word. If at 829 it is a valid remote-control transmitter 25 code word synchronization bit, then at 833 the format word bits are loaded, one at a time sequentially or in parallel, for indexing or sorting and storing the incoming code word which is transmitted. Controller 35 at 835 checks whether the bit just loaded is a logic zero or a logic one and sets the index to the hopping register at 837 if it is a zero and to the fixed register at 839 if it is a one.

Controller 35 waits for another complete bit to be received at 841. At 843, the last received bit is checked for validity and if it is not valid (too long or too short), controller 35 goes to the 827 step of the RF input routine and waits for another correct synchronization bit. If the bit is valid (not too long or too short), then at 845 controller 35 checks the duty cycle of the bit to determine if the bit is a logical zero or a logical one. If the duty cycle falls within the duty cycle timing allowed for a zero, then at 847 a zero is loaded (shifted) into the indexed code register. If the duty cycle falls within the duty cycle timing allowed for a one, then at 849 a one is loaded or shifted into the indexed code register. At 851, controller 35 checks if this is the last bit of this word and if it is not, then controller 35 repeats steps 833 through 851 until it is the last bit, at which time controller 35 proceeds to 853. At 853, controller 35 compares the last received fixed code with previously received fixed code to determine if there is an exact match. If there is not a match, then controller 35 proceeds to step 827 of the RF input routine and waits for another word to be transmitted. If the last received fixed code compares with previously received data, then controller 35 compares the hopping code just received with previously received hopping codes at 855. If the code does not compare, then controller 35 proceeds to RF input step 827 waits for another remote-control transmitter 25 code word to be input. In the preferred embodiment, if the code does compare, then controller 35 checks if this is the fourth correct word received at 857. In other embodiments the number of compares may vary from 1 to n. If it is not the fourth correct word, then controller 35 again goes back to RF input step 827 and waits for another code word to be transmitted. If it is the fourth correct code word, then controller 35 stores both remote-control transmitter 25 format word and remote-control transmitter 25 code word comprising fixed and hopping codes and the unique hopping algorithm, if there is one, in EEPROM 37 at 859. These words are stored in linked or associated memory in order to always maintain a link between the format word and its code word. At 861, controller 35 notifies the operator with audible and/or visual outputs that remote-control transmitter 25 codes have been accepted and stored in memory. At 863, controller 35 checks if the above format word is the only format word for this remote-control transmitter 25 and if it is not, then it proceeds to 859 to store remote-control transmitter 25 codes again for this remote-control transmitter 25, after which it will notify the operator again that the data has been stored at 861. If it is the last set controller 35 exits the learn routine for this remote-control transmitter 25 and waits for additional remote-control transmitters 25 to be input or a learn routine exit command input to be generated.

PROGRAMMING THE CONTROLLER USING TYPE TWO REMOTE TRANSMITTER

Unique remote-control transmitter 25 type two transmits remote-control transmitter 25 format word and the normal remote-control transmitter 25 code word alternately (every other word is a format word and every other word is a code word with fixed and hopping codes). The format word will have a synchronization pulse with a high period equal to two thirds of a bit period to allow controller 35 to distinguish it from the code word, which has a synchronization bit with a high period equal to approximately one third of a bit period. Again this is done to prevent cross wording between format words and code words or vice versa during remote-control transmitter 25 learn routine.

Figure 10A:
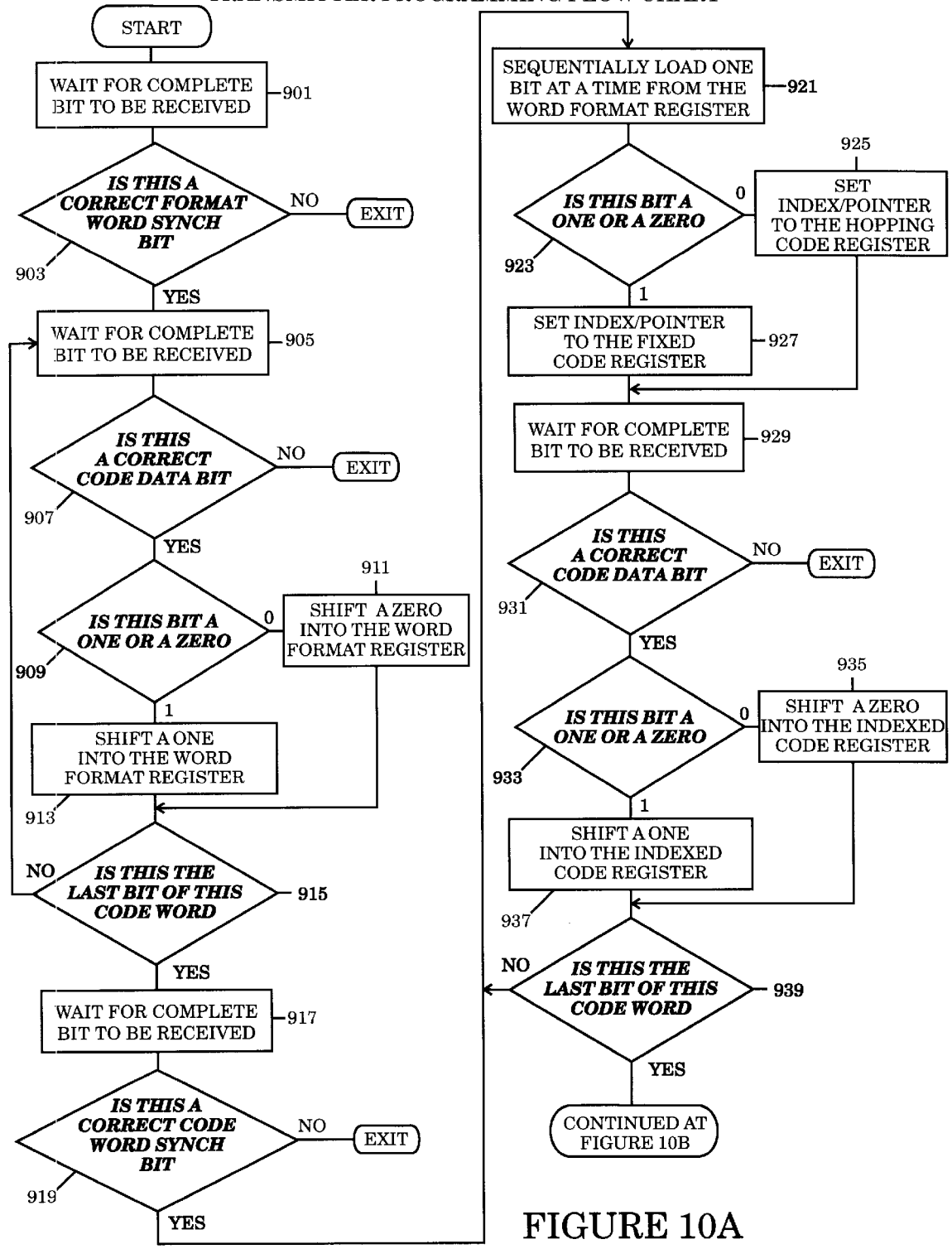
Figure 10B:
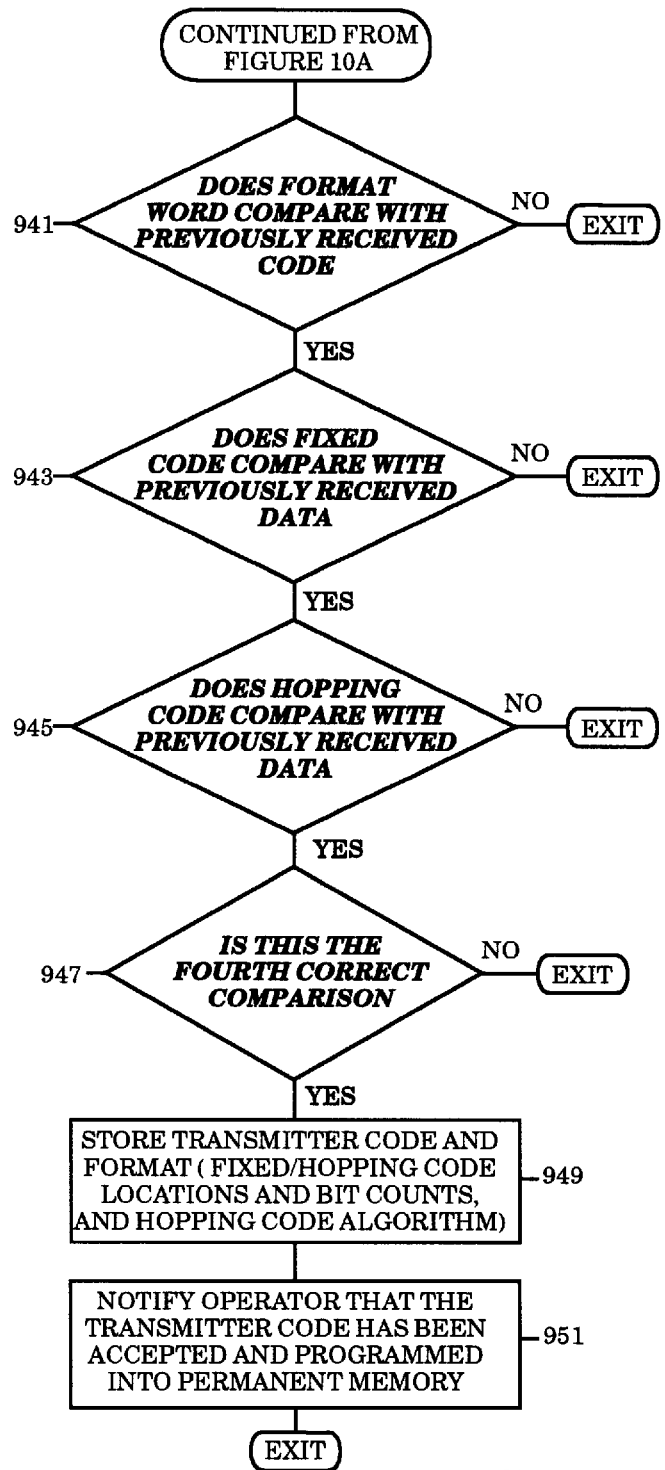

At 901 of FIG. 10, controller 35 waits for a complete bit to be received, the input to go high at the end of gap and then to go low. At 903, controller 35 checks if the bit received is a correct format word synchronization bit. If the high segment of the bit is too long or too short, as may be caused by RF or receiver noise or interference, controller 35 exits the RF input routine and waits for another transmission. If the bit is a valid format word synchronization bit, then controller 35 waits for another complete bit to be received at 905. At 907, the bit just received is checked for validity and if it is not valid (the bit is too long or too short), controller 35 exits the RF input routine. If the bit is valid (not too long or too short), then at 909 controller 35 checks the duty cycle of the bit to determine if the bit is a logic zero or a logic one. If the duty cycle falls within the duty cycle timing allowed for a zero, then at 911 a zero is loaded (shifted) into the word format register. If the duty cycle falls within the duty cycle timing allowed for a one, then at 913 a one is loaded (shifted) into the word format register. At 915, controller 35 checks if this is the last bit of this word and if it is not, then controller 35 repeats steps 905 through 915 until it is the last bit, at which time controller 35 proceeds to 917.

At 917 of FIG. 10, controller 35 waits for a complete bit to be received, the input to go high at the end of gap and then to go low. When the bit is complete, controller 35 at 919 checks if it is a valid remote-control transmitter 25 code word synchronization bit, and if it is not a valid remote-control transmitter 25 code word synchronization bit, then controller 35 exits to wait for another complete bit to be input. If at 919 it is a valid remote-control transmitter 25 normal code word synchronization bit, then at 921 the format word bits are used one at a time, sequentially, for indexing the storage of the code word. Controller 35 at 923 checks the last loaded bit for its logic value of a zero or a one and sets the index to the hopping register at 925 if it is a zero and to the fixed register at 927 if it is a one.

Controller 35 then waits for another complete bit to be received at 929. At 931, the bit just received is checked for validity and if it is not valid (too long or too short), controller exits the RF input routine to wait for another word. If the bit is valid (the bit is not too long or too short), then at 933 controller 35 checks the duty cycle of the bit to determine if the bit is a logic zero or a logic one. If the duty cycle falls within the duty cycle timing allowed for a logic zero, then at 935 a zero is loaded (shifted) into the indexed code register (either the fixed code register or the hopping code register). If the duty cycle falls within the duty cycle timing allowed for a one, then at 937 a one is loaded (shifted) into the indexed code register. At 939, controller 35 checks if this is the last bit of this word and if it is not, then controller 35 will repeat steps 921 through 939 until it is the last bit, at which time controller 35 will proceed to 941.

At 941, controller 35 compares the format word just received with previously received format words to determine if there is an exact comparison/match. If no exact match is found controller 35 exits the RF input routine and waits for another pair of words to be input by remote-control transmitter 25. If format words do compare then at 943 the last received fixed code is compared with previously received fixed code to determine if there is an exact match, and if there is not, then controller 35 exits the RF input routine and waits for another pair of words to be input. If the fixed code just received compares with previously received fixed codes, then at 945 controller 35 compares the hopping code just received with previously received hopping codes. If the hopping code does not compare, then controller 35 exits the RF input routine and waits for another pair of remote-control transmitter 25 code words to be input. In the preferred embodiment, if the code does compare, then controller 35 checks if this is the fourth correct word pair received at 947. In other embodiments, the number of compares may vary from 1 to n. If it is not the fourth correct word pair, then controller 35 exits the RF input routine and waits for another pair of code words to be input. If it is the fourth correct code word set, then controller 35 stores both remote-control transmitter 25 format word and the code word in EEPROM 37 at 949. The code word is composed of fixed and hopping codes and in some embodiments a unique or particular hopping algorithm for remote-control transmitter 25 as described above. At 951, controller 35 notifies the operator with audible and/or visual outputs that remote-control transmitter 25 codes have been accepted and stored in memory. Then, controller 35 exits the learn routine, for this remote-control transmitter 25 and waits for additional remote-control transmitters 25 to be input or a learn routine exit command input to be generated.

RF input routine operation of the last two embodiments employs the same operation as described for the master-fixed-code embodiment. The reader is referred to FIG. 6 and its associated disclosure herein for the normal operation between remote-control transmitter 25 and controller 35.

The description given in this preferred embodiment should not limit the number of unique remote-control transmitters 25, master fixed code types, method of transmission, or the way in which scrambled data is originated at remote-control transmitter 25 and deciphered at control module 29. There are many ways the processes or methods can be arranged to accomplish the same goals. In addition, the preferred embodiment of this invention provides for a 36 bit code word. However, this number is in no way an absolute number of bits that could or should be employed. This invention accommodates any word length. In light of the disclosure herein any number of bits may be used to define the code word and the format word and any number of fixed and hopping bits may define the code word. The upper and lower limits of the word length are driven by the component speed, application and manufacturer requirements. The master-fixed code and unique code systems could use code words with different lengths (i.e. bit counts) in the same system at the same time.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A system for monitoring and controlling an area comprising:
   a) a controller for controlling system operational functions;
   b) at least one remote control transmitter for transmitting system commands to said controller in a code word having a fixed word and a hopping word therein;
   c) said fixed word comprising at least one fixed data bit;
   d) said hopping word comprising at least one changing data bit, wherein said hopping word changes its binary value from transmission to transmission of said system commands; and,
   e) a format word resident in said transmitter and said controller for respectively scrambling and descrambling said bits of said fixed word and said bits of said hopping word within said code word to generate a scrambled code word transmitted from said transmitter to said controller.

2. The system of claim 1 wherein said fixed word includes at least one bit therein and said hopping word includes a multiplicity of bits therein.

3. The system of claim 1 wherein said hopping word includes at least one bit therein and said fixed word includes a multiplicity of bits therein.

4. The system of claim 1 wherein said format word is programmed in said transmitter for scrambling said fixed bits and said hopping bits of said code word in a predefined arrangement.

5. The system of claim 1 wherein said format word is programmed within said transmitter and said controller for descrambling said code word received by said controller into said fixed and said hopping words.

6. The system of claim 1 further comprising a hopping algorithm for modifying said hopping word of said transmitter n-times in response to n-times activation of said transmitter and for modifying said hopping word m-times within said controller upon receipt of said code word m-times from said transmitter.

7. The system of claim 6 further comprising a learn mode for programming 0-time modified hopping word of said transmitter as a 0-time modified hopping word of said controller, thereby providing an initial match between said transmitter and said controller hopping words.

8. The system of claim 6 wherein said hopping algorithm modifies said hopping word of said transmitter and said hopping word of said controller.

9. The system of claim 6 wherein said hopping algorithm is a pointer to a look-up table containing a group of binary words therein, said look-up table programmed in both said transmitter and said controller.

10. The system of claim 6 further including:
    a) calculating means for modifying said hopping word, received by said controller from said authorized transmitter, with said hopping algorithm (m+x)-times for comparison with said n-time modified hopping word received from said authorized transmitter if said n-time modified and said m-time modified hopping codes do not match; and,
    b) said controller storing said authorized transmitter hopping word if said hopping words do not match after performing said hopping algorithm (m+x) times.

11. The system of claim 1 further including:
    a) an identification code particular to said transmitter transmitted within said code word; and,
    b) said controller storing said identification code for identification of said transmitter.

12. The system of claim 11 further including a memory for storing said identification code.

13. The system of claim 11 further including an electrically erasable and programmable read only memory for storing said identification code.

14. The system of claim 11 further comprising at least one authorized and at least one unauthorized remote control transmitter, each said transmitter having said particular identification code therein, for rejecting commands received by said controller from said unauthorized transmitters.

15. The system of claim 14 wherein said system command transmitted by said authorized transmitter is executed by said controller when said n-times modified hopping word transmitted by said transmitter and m-times modified hopping word of said controller are identical.

16. The system of claim 1 further including a transmission from said transmitter comprising a continuous series of said code words, said transmission initiated by activation of a switch integral to said transmitter and terminated by deactivation of said switch.

17. The system of claim 16 wherein said code words within said transmission are identical.

18. Method for monitoring and controlling an area comprising the steps of:
    a) storing an initial hopping word within a remote control transmitter and a controller;
    b) storing a fixed word within said remote control transmitter and said controller;
    c forming a scrambled code word by using a format word to interlace bits from said fixed and said hopping words and transmitting said scrambled code word to said controller.

19. The method of claim 18 further including the step of defining said fixed code by multiplicity of bits.

20. The method of claim 18 further including the step of defining said hopping code by multiplicity of bits.

21. The method of claim 18 further including the steps of:
a) programming a format word within said remote control transmitter for scrambling said bits of said fixed and said hopping words into said code word;
b) scrambling said fixed and said hopping words of said code word and constructing said code word by sequentially shifting said fixed word bits into an output register for every logic one of said format word and sequentially shifting said hopping word bits into said output register for every logic zero of said format word.

22. The method of claim 21 further including the steps of:
a) programming said format word in said controller; and,
b) descrambling said code word received by said controller by sequentially shifting bits of said received code word into fixed and hopping registers, wherein a bit is shifted into said fixed register of said controller if said format word bit logic value is one and into said hopping register of said controller if said format word bit value is a logic zero.

23. The method of claim 18 further including the steps of:
a) programming a hopping algorithm into said transmitter and said controller, each having a 0-times modified, initial hopping word therein;
b) modifying said initial hopping word n-times in response to n-times activation of said transmitter;
c) transmitting said n-times modified hopping word to said controller;
d) receiving said n-times modified hopping word within said controller; and,
e) modifying said hopping word m-times in response to receipt of said code word m-times from said transmitter.

24. The method of claim 23 further including the steps of:
a) entering a learning mode of said transmitter and said controller; and,
b) programming 0-time modified hopping word of said transmitter as a 0-time modified hopping word of said controller thereby providing an initial match between said transmitter and said controller hopping words.

25. The method of claim 23 further including the step of defining said hopping algorithm as a mathematical formula for mathematically modifying said hopping word of said transmitter and said hopping word of said controller.

26. The method of claim 23 further including the steps of:
a) defining said hopping algorithm as a pointer to a look-up table containing binary words therein; and,
b) programming said look-up table in said transmitter and said controller.

27. The method of claim 23 further including the steps of:
a) modifying said hopping word, received by said controller from said authorized transmitter, with said hopping algorithm (m+x)-times for comparison with said n-time modified hopping word received from said authorized transmitter, if said n-time modified and said m-time modified hopping codes do not match; and,
b) storing said authorized transmitter hopping word if said hopping words do not match after performing said hopping algorithm (m+x) times.

28. The method of claim 18 further including the steps of:
a) assigning an identification code particular to said transmitter transmitting said code word; and,
b) programming said identification code particular to said transmitter into said controller for identification of said transmitter.

29. The method of claim 28 wherein the step of storing said identification code into said controller includes the step of storing said identification code in a memory device.

30. The method of claim 28 wherein the step of storing said identification code into said controller includes the step of storing said identification code in an electrically erasable and programmable read only memory.

31. The method of claim 28 further including the steps of:
a) recognizing said transmitter having said identification code as an authorized transmitter if said identification code is programmed in said controller;
b) recognizing said transmitter having said identification code as an unauthorized transmitter if said identification code is not programmed in said controller; and,
c) rejecting commands received by said controller from said unauthorized transmitter.

32. The method of claim 31 further including the steps of:
a) receiving said code word, having said n-times modified hopping word therein, from said authorized transmitter;
b) performing said hopping algorithm on last received hopping word of said authorized transmitter;
c) comparing said n-times modified hopping word from said transmitter and m-times modified word of said controller; and,
d) executing said system command transmitted by said authorized transmitter if said n-times modified hopping word and said m-times modified hopping word are identical.

33. The method of claim 18 further including the steps of:
a) activating said transmission from said transmitter by activating a switch integral to said transmitter;
b) continuously transmitting a continuous series of said code words from said transmitter to said controller; and,
c) terminating said transmission by deactivation of said switch.

34. The method of claim 33 further including the step of transmitting identical code words within said transmission.

* * * * *